US011654500B2

(12) United States Patent
Yamada et al.

(10) Patent No.: US 11,654,500 B2
(45) Date of Patent: May 23, 2023

(54) JOINING METHOD AND STRUCTURE FOR LAMINATE SHAPING COMPONENT, AND LAMINATE SHAPING COMPONENT

(71) Applicant: KOBE STEEL, LTD., Hyogo (JP)

(72) Inventors: Takeshi Yamada, Hyogo (JP); Shinji Sato, Hyogo (JP); Takemasa Yamasaki, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 436 days.

(21) Appl. No.: 16/605,471

(22) PCT Filed: Apr. 16, 2018

(86) PCT No.: PCT/JP2018/015767
§ 371 (c)(1),
(2) Date: Oct. 15, 2019

(87) PCT Pub. No.: WO2018/198871
PCT Pub. Date: Nov. 1, 2018

(65) Prior Publication Data
US 2020/0124070 A1      Apr. 23, 2020

(30) Foreign Application Priority Data

Apr. 27, 2017   (JP) .............................. JP2017-088781
Sep. 15, 2017   (JP) .............................. JP2017-177813

(51) Int. Cl.
*B23K 9/035* (2006.01)
*B33Y 80/00* (2015.01)
(Continued)

(52) U.S. Cl.
CPC ............ *B23K 9/0356* (2013.01); *B22F 10/25* (2021.01); *B23K 26/342* (2015.10); *B33Y 40/20* (2020.01);
(Continued)

(58) Field of Classification Search
CPC ........ B22F 3/105; B23K 9/0282; B33Y 50/02
See application file for complete search history.

(56) References Cited

U.S. PATENT DOCUMENTS 4,247,037 A    1/1981 Tamai et al.
9,279,328 B2 * 3/2016 Roy ........................ B22F 10/20
(Continued)

FOREIGN PATENT DOCUMENTS

CN      106513679 A       3/2017
DE   10 2014 012425 A1    3/2016
(Continued)

OTHER PUBLICATIONS

The extended European search report issued by the European Patent Office dated Dec. 22, 2020, which corresponds to European Patent No. 18790440.4-1016 and is related to U.S. Appl. No. 16/605,471.
(Continued)

*Primary Examiner* — Jacob J Cigna
(74) *Attorney, Agent, or Firm* — Studebaker & Brackett PC

(57) ABSTRACT

A method for joining an additively-manufactured component includes welding a plurality of additively-manufactured components via a weld joint to fabricate an integral structure. The additively-manufactured components are built by repeatedly depositing a weld bead layer of a next layer on a weld bead layer formed of a weld bead obtained by melting and solidifying a filler metal by use of an arc, and the weld joint is built along with the deposition.

8 Claims, 19 Drawing Sheets

(51) Int. Cl.
  *B23K 26/342* (2014.01)
  *B33Y 40/20* (2020.01)
  *F16B 5/08* (2006.01)
  *B22F 10/25* (2021.01)
  *B22F 10/32* (2021.01)

(52) U.S. Cl.
  CPC ............... *B33Y 80/00* (2014.12); *F16B 5/08* (2013.01); *B22F 10/32* (2021.01)

(56) References Cited

U.S. PATENT DOCUMENTS

| | | | |
|---|---|---|---|
| 10,569,473 B2* | 2/2020 | Burd | B22F 7/062 |
| 2015/0021379 A1 | 1/2015 | Albrecht et al. | |
| 2015/0037162 A1* | 2/2015 | James | F01D 5/30 |
| | | | 416/220 R |
| 2015/0086408 A1 | 3/2015 | Kottilingam et al. | |
| 2016/0151977 A1* | 6/2016 | Burd | B22F 7/062 |
| | | | 700/98 |
| 2017/0189966 A1* | 7/2017 | Giannozzi | F04D 29/2222 |
| 2017/0274455 A1 | 9/2017 | Herzog | |
| 2018/0021890 A1* | 1/2018 | Griffith | B23K 33/004 |
| | | | 403/272 |
| 2018/0163744 A1* | 6/2018 | Mironets | B23K 9/044 |

FOREIGN PATENT DOCUMENTS

| | | |
|---|---|---|
| FR | 3036300 A1 * | 11/2016 |
| JP | 2005-054197 A | 3/2005 |
| JP | 3784539 B2 | 6/2006 |
| JP | 2007-283348 A | 11/2007 |
| JP | 2015-067902 A | 4/2015 |
| JP | 2015-160217 A | 9/2015 |
| JP | 2016-182634 A | 10/2016 |
| JP | 2016-196012 A | 11/2016 |
| JP | 2016-210068 A | 12/2016 |
| WO | 2015/181080 A1 | 12/2015 |

OTHER PUBLICATIONS

International Search Report issued in PCT/JP2018/015767; dated Jun. 19, 2018.

Written Opinion issued in PCT/JP2018/015767; dated Jun. 19, 2018.

\* cited by examiner

JOINING METHOD AND STRUCTURE FOR LAMINATE SHAPING COMPONENT, AND LAMINATE SHAPING COMPONENT

TECHNICAL FIELD

The present invention relates to a joining method for an additively-manufactured component, a structure of an additively-manufactured component and an additively-manufactured component.

BACKGROUND ART

In recent years, there is a growing need for a 3D printer as a production means in particular, regarding application of a metal material to a building material, researches and developments toward practical realization have been made in aircraft industry, etc. A 3D printer for building using a metal material is configured to obtain a built-up object by melting a metal powder or a metal wire by use of a heat source such as a laser or an arc, and depositing the molten metal. The technique for producing a built-up object by depositing a molten metal in this way is described, for example, in Patent Literature 1.

Patent Literature 1 describes a method for producing a metal mold, including generating profile data representing the profile of a metal mold, dividing a metal mold into multilayers along contour lines based on the generated profile data, and creating a travel path of a welding torch for feeding a filler metal based on the obtained profile data of multilayers.

CITATION LIST

Patent Literature

Patent Literature 1: Japanese Patent No. 3784539

SUMMARY OF INVENTION

Technical Problem

However, in the technique described in Patent Literature 1, the size of the manufacturable additively-manufactured object is limited by the manufacturing apparatus. For example, in the case where the manufacturing apparatus is a welding robot having a welding torch at the tip of an articulated arm, the size of the additively-manufactured object produced is limited to a size within the range of movement of the articulated arm. Consequently, fabrication of an additively-manufactured object having a size larger than the range of movement is difficult.

In addition, in the case where the layered structure has an overhang shape including a small diameter part in the middle or a shape including a fold-back part or, furthermore, has a more complicated shape such as a node portion of truss structure or a T-shaped, Y-shaped or K-shaped connection (TYK connections) part formed by crossing between a chord member and a brace member, it is sometimes difficult to create a layered structure at once by additive manufacturing.

Typically, manufacture of an additively-manufactured object assumes that a structure as a whole is fabricated in one manufacturing step. This is because, by additively manufacturing an object at once, high-efficiency manufacture with a reduction in the number of steps can be performed and moreover, a dimensional change or a change in quality of the material can be kept to a minimum. Therefore, in the case where the layered structure has an excessively large size or a complicated shape, manufacture of a normal additively-manufactured object may not be applied, imposing a limitation on the manufacture of an additively-manufactured object.

An object of the present invention is to provide a joining method for an additively-manufactured component that can be fabricated easily with a high quality without being limited by the size of the additively-manufactured component, a structure of an additively-manufactured component and an additively-manufactured component.

Solution to Problem

The present invention includes the following configurations.

(1) A method for joining an additively-manufactured component, including welding a plurality of additively-manufactured components via a weld joint to fabricate an integral structure, in which:

the additively-manufactured components are built by repeatedly depositing a weld bead layer of a next layer on a weld bead layer formed of a weld bead obtained by melting and solidifying a filler metal by use of an arc; and the weld joint is built along with the deposition.

In this joining method for an additively-manufactured component, a plurality of additively-manufactured components built by depositing a weld bead layer composed of a plurality of weld beads are welded via a weld joint built by the weld bead layer, and an integral structure is thereby fabricated. Therefore, a structure larger than the maximum size of an additively-manufactured component that can be built by a manufacturing apparatus can be fabricated. In addition, even in the case where the structure has a complicated shape, the structure can be fabricated easily with a high quality without involving a limitation.

(2) The method for joining an additively-manufactured component according to (1), in which:

the weld bead layer is formed of the weld beads arranged in a plurality of rows; and the weld bead layer of a next layer is deposited with a shift in one direction within the layer plane from the layer end edge of the bead layer of a previous layer to build a groove shape of the weld joint.

In this joining method for an additively-manufactured component, since the shape of the weld joint is formed by additive manufacturing, the number of processing steps can be reduced compared to the case of forming a weld joint by post-processing such as cutting.

(3) The method for joining an additively-manufactured component according to (1) or (2), in which a backing strip is arranged in the weld joint and the additively-manufactured components are welded to each other together with the backing strip.

In this joining method for an additively-manufactured component, the additively-manufactured component and a to-be-welded component are firmly welded.

(4) The method for joining an additively-manufactured component according to (3), in which:

a bent portion formed by bending a bead extension-direction end is formed in the weld bead, and the weld bead layer of a next layer is repeatedly deposited on the weld bead layer of a previous layer to build the backing strip by the bent portion.

In this joining method for an additively-manufactured component, the backing strip is integrally built with the additively-manufactured component and therefore, a member serving as a backing strip need not be prepared separately and a backing strip need not be fixed. Consequently, welding of the additively-manufactured component and the to-be-welded component is easily performed.

(5) The method for joining an additively-manufactured component according to (3), in which:

the weld bead layer is formed of the weld beads arranged in a plurality of rows; and one end of the weld bead layer in an arrangement direction of the weld bead is shifted to one side of a bead extension direction within the weld bead layer to build the backing strip.

In this joining method for an additively-manufactured component, the backing strip is built integrally with the additively-manufactured component and therefore, a member serving as a backing strip need not be prepared separately and a backing strip need not be fixed. Consequently, welding of the additively-manufactured component and the to-be-welded component is easily performed.

(6) The method for joining an additively-manufactured component according to (1), in which:

the weld bead layer is formed of an annular weld bead; and the weld bead layer of a next layer is deposited on at least one of an annular inner circumferential side and an outer circumferential side in the weld bead layer of a previous layer to build the weld joint in the additively-manufactured component.

In this joining method for an additively-manufactured component, since the weld joint is formed by additive manufacturing, the number of processing steps can be reduced compared to the case of forming a weld joint by post-processing such as cutting.

(7) A structure by welding a plurality of additively-manufactured components via a weld joint, in which:

the additively-manufactured components are built by depositing a weld bead layer formed by melting and solidifying a filler metal; and the weld joint is built by depositing the weld bead layer.

In this structure, a plurality of additively-manufactured components are welded and integrally configured, and therefore the size can be made larger than the maximum buildable size of the manufacturing apparatus for fabricating individual additively-manufactured components. In addition, even in the case where the structure has a complicated shape incapable of being deposited and built at once, the structure can be configured to be easily manufacturable.

(8) The structure according to (7), in which the weld joint is at least any one of a butt joint, a T-joint, a cruciform joint, a corner joint, a spliced joint, a lap joint, and an edge joint.

In this structure, an additively-manufactured component can be joined with high weld strength.

(9) The structure according to (7) or (8), in which the additively-manufactured component has a cylindrical shape and the additively-manufactured components are coaxially welded to each other.

In this structure, a configuration where cylindrical additively-manufactured components are coaxially joined is provided, and a tubular body with a long axis length is easily obtained.

(10) The structure according to any one of (7) to (9), in which a backing strip built by depositing the weld bead layer is provided on the weld joint and the additively-manufactured components are welded to each other together with the backing strip.

In this structure, the additively-manufactured component and the to-be-welded component are firmly welded.

(11) An additively-manufactured component which is the additively-manufactured component to constitute the structure according to any one of (7) to (10), in which the weld joint being weldable to another additively-manufactured component different from the additively-manufactured component is built by the weld bead layer deposited.

In this additively-manufactured component, because of a configuration where additively-manufactured components can be welded to each other via a weld joint built by deposition, the joining structure can be simplified, and the number of process for joining can be reduced.

(12) An additively-manufactured component which is the additively-manufactured component to constitute the structure according to any one of (7) to (10), in which the weld joint being weldable to a to-be-welded component is built by the weld bead layer deposited.

In this additively-manufactured component, a structure having any shape is easily obtained by welding the additively-manufactured component to another to-be-welded component different from the additive-manufactured component.

Advantageous Effects of Invention

In the present invention, a structure can be fabricated easily with a high quality without being limited by the size of the additively-manufactured component or the complexity of the shape.

DESCRIPTION OF EMBODIMENTS

Figure 1:
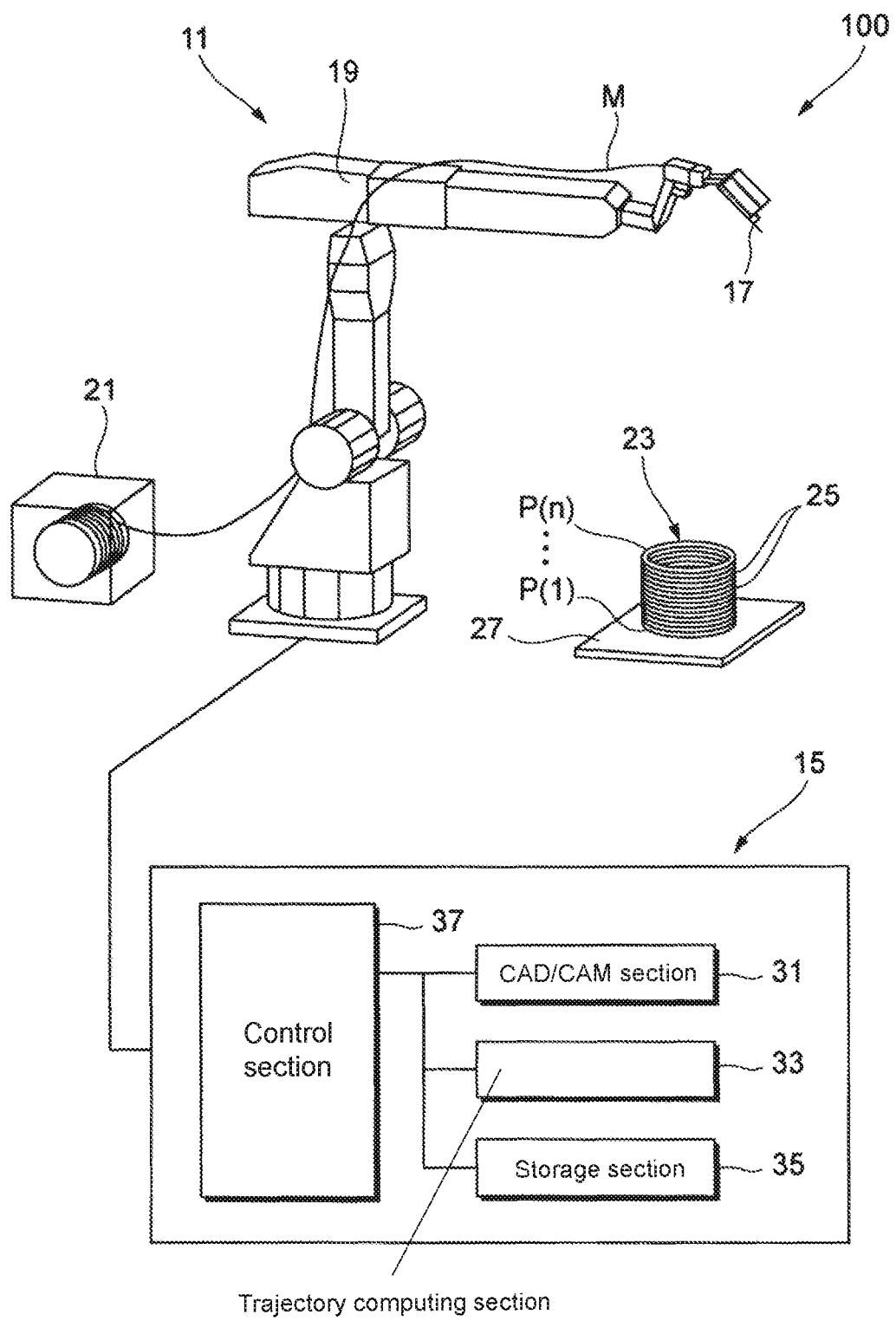
FIG. 1 is a configuration view of the manufacturing apparatus used for the fabrication of an additively-manufactured component.

The embodiments of the present invention are described in detail below by referring to the drawings. The structure of the present invention is obtained by welding a plurality of additively-manufactured components formed in the later-described additive manufacturing step, via a weld joint built simultaneously in this additive manufacturing step. Consequently, a structure larger than the maximum size that is limited by the range of movement of a manufacturing apparatus and allowed for one fabricatable additively-manufactured component can be fabricated.

FIG. 1 is a configuration view of the manufacturing apparatus used for the fabrication of the additively-manufactured component.

A manufacturing apparatus 100 of this configuration includes an additive manufacturing device 11 and a controller 15 for collectively controlling the additive manufacturing device 11. The additive manufacturing device 11 includes a welding robot 19 having a torch 17 on the tip axis and a filler metal feeding section 21 for feeding a filler metal (weld wire) M to the torch 17. The controller 15 includes a CAD/CAM section 31, a trajectory computing section 33, a storage section 35, and a control section 37 to which those sections are connected.

The welding robot 19 is an articulated robot, and a filler metal M is supported by a torch 17 provided on the tip axis such that the filler metal M can be continuously fed. The position or posture of the torch 17 can be three-dimensionally, arbitrarily set within the range of the degree of freedom.

The torch 17 has a shield nozzle (not shown j, and a shielding gas is supplied from the shield nozzle. The arc welding method may be either a consumable electrode type such as shielded metal arc welding and carbon dioxide gas arc welding, or a non-consumable electrode type such as TIG welding and plasma arc welding, and is appropriately selected depending on the additively-manufactured body fabricated.

For example, in the case of a consumable electrode type, a contact tip is disposed inside of the shield nozzle, and a filler metal M to which a melting current is to be supplied in held on the contact tip. The torch 17 generates an arc from the tip of the filler metal M in a shielding gas atmosphere while holding the filler metal M. The filler metal M is fed from the filler metal feeding section 21 to the torch 17 by a delivery mechanism (not shown) attached to a robot arm, etc. Then, when the continuously fed filler metal M is melted and solidified while the torch 17 is moved, a linear weld bead 25 is formed on a base 27.

In the CAD/CAM section 31, the profile data of an additively-manufactured component 23 intended to fabricate is input, the component is divided into a plurality of mutually parallel layers P(1) . . . P(n) based on the profile data, and the layer profile data representing the shape of each layer P(1) . . . P(n) is generated. In the trajectory computing section 33, a movement trajectory of the torch 17 is determined based on the layer profile data generated. In the storage section 35, the generated data such as layer profile data and the movement trajectory of the torch 17, and furthermore, a drive program for moving the torch 17 are stored.

In the control section 37, the drive program based on the layer profile data or the movement trajectory of torch 17 stored in the storage section 35 is executed to drive the welding robot 19. More specifically, the welding robot 19 moves the torch 17 depending on the command from the controller 15 while melting the filler metal M by an arc based on the movement trajectory of the torch 17 generated in the trajectory computing section 33. FIG. 1 illustrates how the cylindrical additively-manufactured component 23 is built up by depositing the weld bead 25 on the base 27 composed of a steel plate.

Figure 2A:
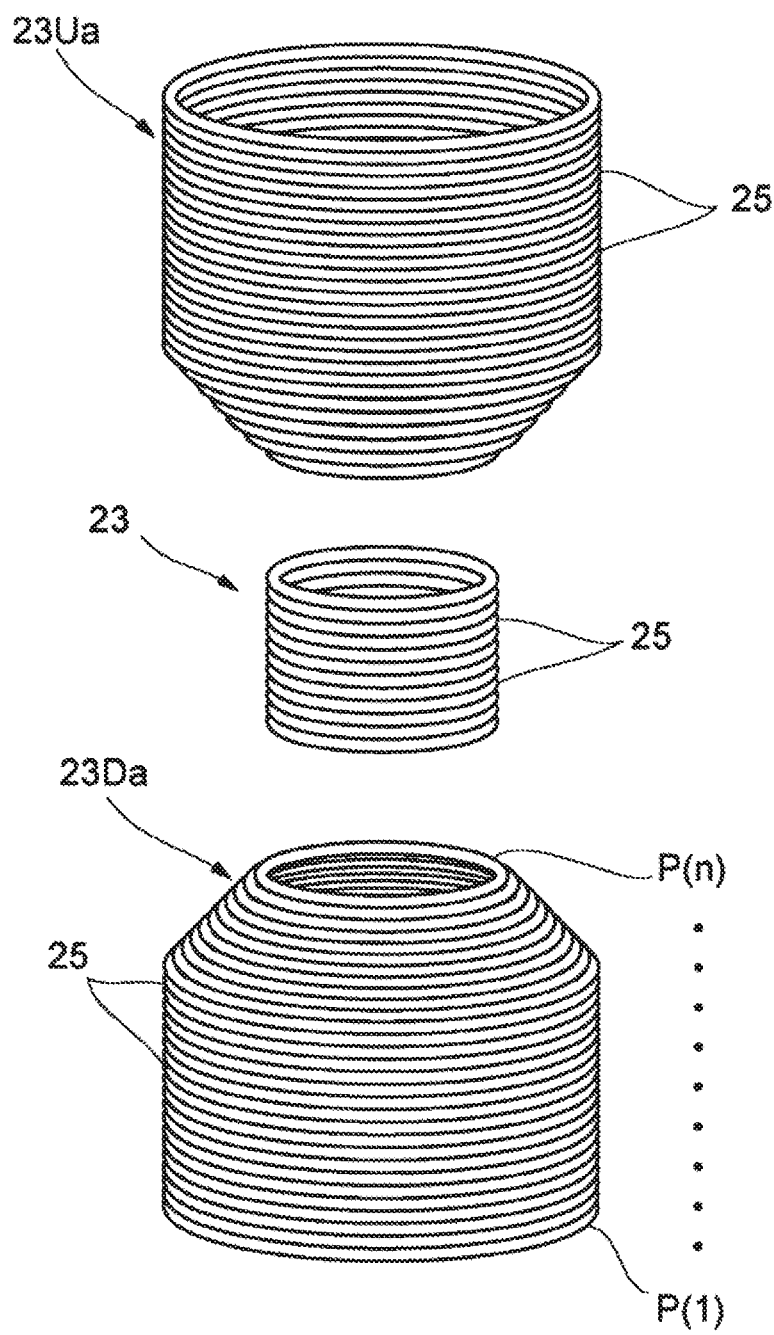
FIG. 2A is an exploded perspective view of the additively-manufactured component, illustrating one configuration example of the structure.

The additively-manufactured component 23 built up by depositing the weld bead 25 illustrated in FIG. 1 has a size equal to or smaller than the maximum size that can be fabricated by the manufacturing apparatus 100. FIG. 2A illustrates one configuration example of the structure. Here, separately from the additively-manufactured component 23, other additively-manufactured components 23Ua and 23Da are prepared. These additively-manufactured components 23Ua and 23Da are also built up by the above-described manufacturing apparatus 100 and have a size equal to or smaller than the maximum size that can be built by the manufacturing apparatus 100.

Figure 2B:
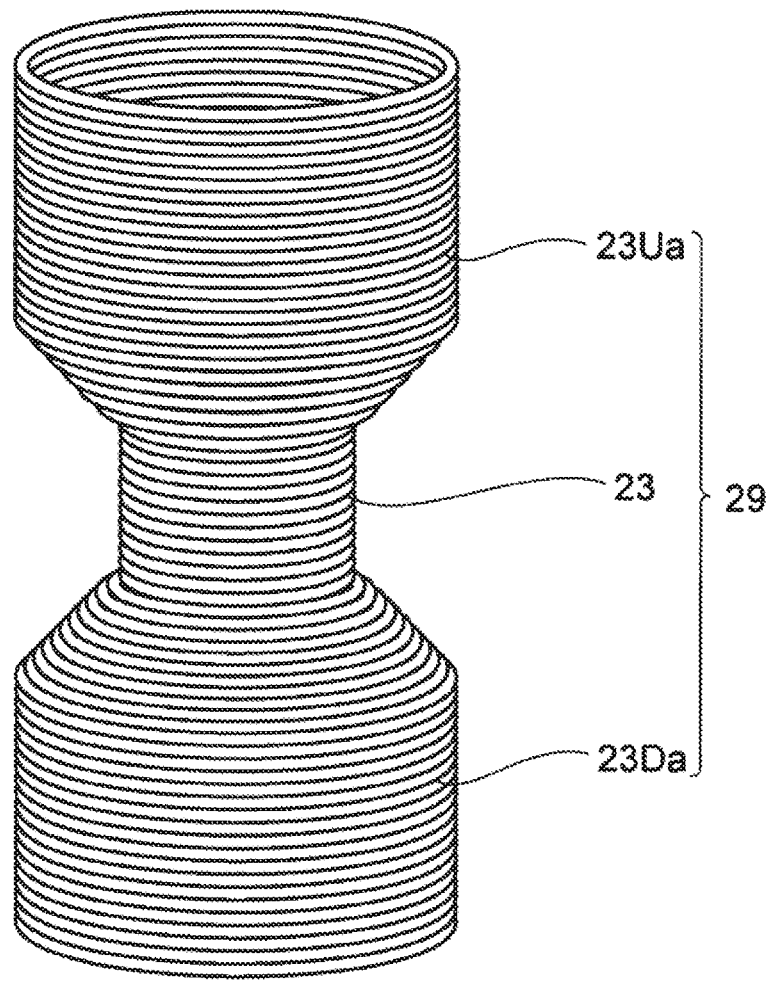
FIG. 2B is an overall perspective view illustrating one configuration example of the structure.

As illustrated in FIG. 2B, three additively-manufactured components 23, 23Ua and 23Da are welded at respective joining parts in a state where the additively-manufactured component 23Ua is arranged above the additively-manufactured component 23 and the additively-manufactured component 23Da is arranged below the additively-manufactured component 23, and a one-body structure 29 is thereby fabricated.

The thus-obtained structure 29 has a size larger than the maximum size of an additively-manufactured component that the manufacturing apparatus 100 for an additively-manufactured component can build up, because a plurality of additively-manufactured components 23, 23Ua and 23Da are welded via a weld joint built together in the additive manufacturing step of the additively-manufactured component. More specifically, an additively-manufactured object larger than the maximum buildable size of the manufacturing apparatus 100 can be fabricated. The structure 29 illustrated here consists of three components, but the number of components is not limited thereto and can be any number of components. In addition, the additively-manufactured components 23, 23Ua and 23Da are welded to each other via a weld joint formed on each component. As the structure of the weld joint, for example in the case of a butt joint, various configurations such as various groove shapes or providing of a backing strip can be employed. Furthermore, the weld joint is not limited to a butt joint and may be other various weld joints.

Even in the case where the structure is smaller than the maximum buildable size, it is sometimes difficult to create the structure at once by additive manufacturing due to its complicated shape. Even in such a case, by dividing the shape of the structure into a plurality of additively-manufactured components, building each of the additively-manufactured components, and then welding the components to each other via a weld joint, the structure can be fabricated easily with a high quality without being limited by the complexity of the shape.

The building method for an additively-manufactured component 23 having a groove shape and the joining method for an additively-manufactured component 23 are described below. The structure 29 is not limited to a configuration where only a plurality of additively-manufactured components are joined, and a part of a member to be joined may be a component other than an additively-manufactured component. In the following description, the partner member to be joined to the additively-manufactured component is referred to as "to-be-welded component". That is, the to-be-welded component may be an additively-manufactured component or may be a component fabricated by other processing methods.

FIRST CONFIGURATION EXAMPLE

Figure 3A:
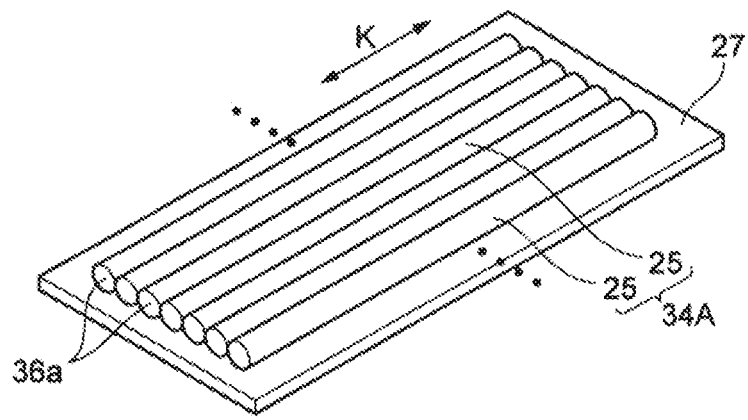
FIG. 3A is a process explanatory view illustrating the fabrication procedure of the additively-manufactured component of a first configuration example.
Figure 3B:
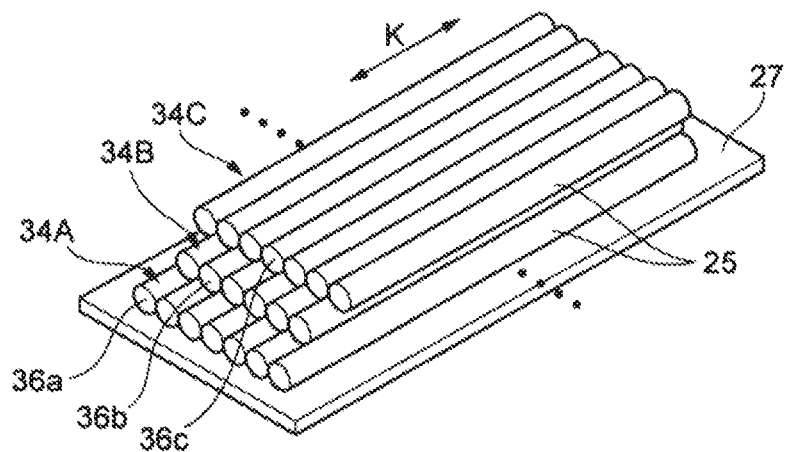
FIG. 3B is a process explanatory view illustrating the fabrication procedure of the additively-manufactured component of a first configuration example.
Figure 3C:
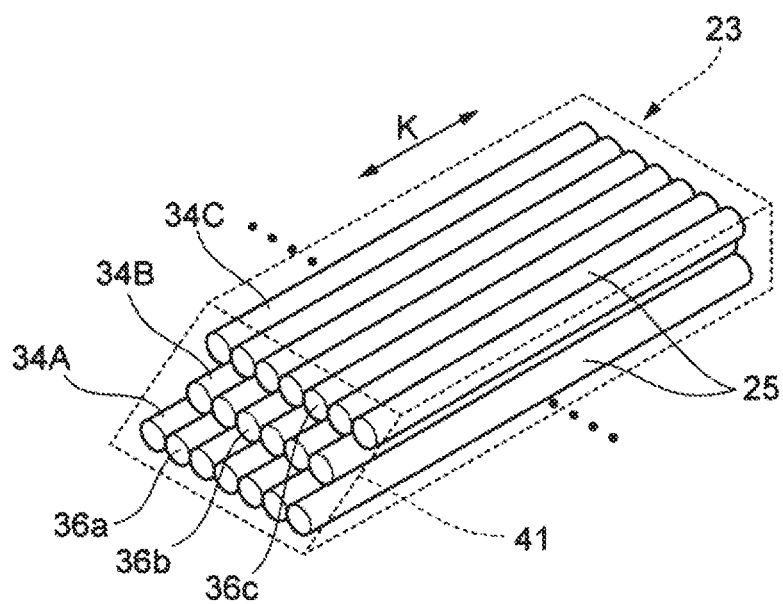
FIG. 3C is a process explanatory view illustrating the fabrication procedure of the additively-manufactured component of a first configuration example.

In the following, particularly, a building procedure of a weld joint for welding additively-manufactured components 23, 23Ua and 23Da illustrated in FIG. 2B to each other is described. FIGS. 3A, 3B and 3C are schematic explanatory views illustrating the building procedure of the additively-manufactured component of a first configuration example.

In the building of a butt weld joint of this configuration, as illustrated in FIG. 3A, first, a weld bead layer (first weld bead layer 34A) composed of a plurality of rows of weld beads 25 is deposited on a base 27.

Next, as illustrated in FIG. 3B, a second weld bead layer 34B is deposited and built on the first weld bead layer 34A with a shift from the layer end edge 36a of the first weld bead layer 34A in the weld bead 25 extension direction K within the layer plane. Similarly, a third weld bead layer 34C is deposited with a shift from the layer end edge 36b of the second weld bead layer 34B in the weld bead 25 extension direction K within the layer plane. By repeating such deposition of the weld bead 25, as illustrated in FIG. 3C, an additively-manufactured component 23 having a weld joint (including a groove) 41 formed by layer end edges 36a, 36b and 36c of the weld bead layers 34A, 34B and 34C, denoted by a dotted line in the figure, is obtained.

In the illustrated example, the number of weld bead layers is three, but in practice, a groove is formed by a larger number of weld bead layers. In addition, the illustrated range is the range of a part of the entire additively-manufactured component. In FIG. 3C, the base 27 illustrated in FIG. 3B is removed to provide an additively-manufactured component 23 having a weld joint (JIS Z 3001) 41 of a single bevel groove shape, The additively-manufactured component 23 built up as described above is, as illustrated in FIG. 4A, arranged to butt against a to-be-welded component 39 serving as a joining partner. In the illustrated example, the schematic contour is denoted by a solid line so as to facilitate understanding of the shape of the weld joint 41. In addition, the to-be-welded component 39 here is illustrated as a component built up by a plurality of weld bead layers, similarly to the additively-manufactured component 23. Then, as illustrated in FIG. 4B, a structure 29A in which the additively-manufactured component 23 and the to-be-welded component 39 are integrated by a welded portion 43 formed by the welding via the weld joint 41, is fabricated.

As the welding apparatus for welding the additively-manufactured component 23 and the to-be-welded component 39, the welding robot 19 of the manufacturing apparatus 100 for building an additively-manufactured component may be used as it is, but another welding apparatus may be separately used.

The structure 29A of this configuration is fabricated by welding the additively-manufactured component 23 and the to-be-welded component 39 via a weld joint built along with the additive manufacturing step of the additively-manufactured component 23. Accordingly, a structure 29A larger than the maximum buildable size of the manufacturing apparatus 100 for an additively-manufactured component can be fabricated without being limited by the range of movement of the manufacturing apparatus 100. Furthermore, even in the case where the structure 29A has a complicated shape, the structure 29A can be fabricated easily with a high quality without involving a limitation. In addition, since the weld joint is formed along with the additive manufacturing step of the additively-manufactured component 23, the number of working process can be reduced, compared with the case of forming the weld joint by cutting, etc.

MODIFICATION EXAMPLE

Figure 5:
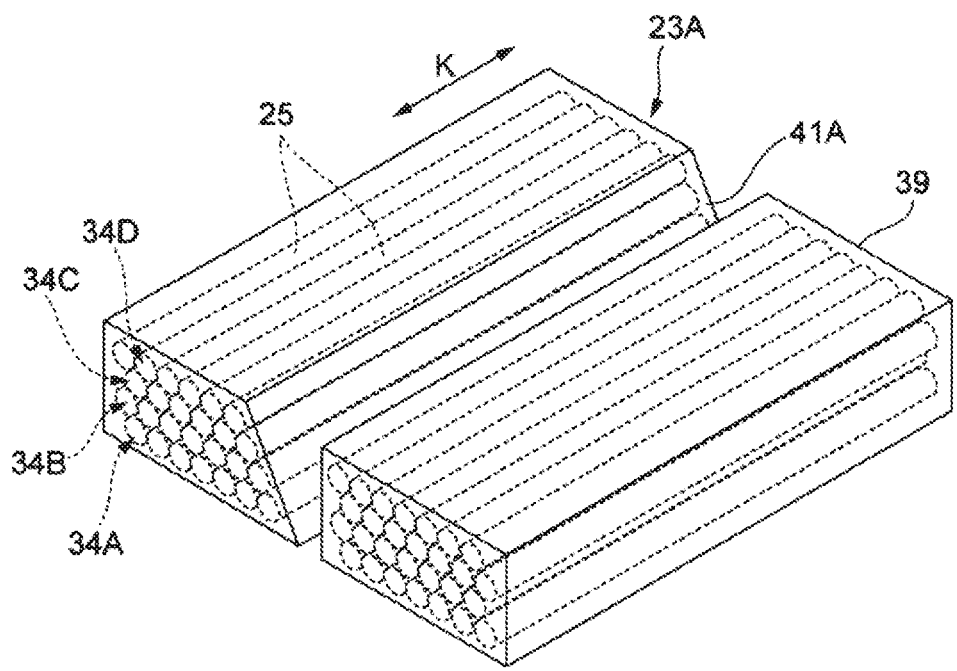
FIG. 5 is a schematic main-part perspective view of a modification example of the additively-manufactured component and the to-be-welded component.

FIG. 5 is a schematic main-part perspective view illustrating a modification example of the additively-manufactured component and the to-be-welded component.

In the additively-manufactured component 23A of this modification example, respective weld bead layers 34A, 34B, 34C and 34D are built up with a shift in a direction orthogonal to the weld bead 25 extension direction K. In this way, the weld beads 25 are shifted in one direction within the weld bead layer, and a weld joint 41A having a single bevel groove shape is built. Other portions are the same as in the first configuration example. In the following description, the same portion is denoted by the same reference sign or corresponding reference sign, and description thereof is simplified or omitted.

In the additively-manufactured component 23A of this configuration, since the weld joint 41A is built so that the weld bead 25 is long and continuous, as compared with the case of the first modification example, the building speed of the weld joint 41A can be increased, and the takt time can be shortened.

Figure 6:
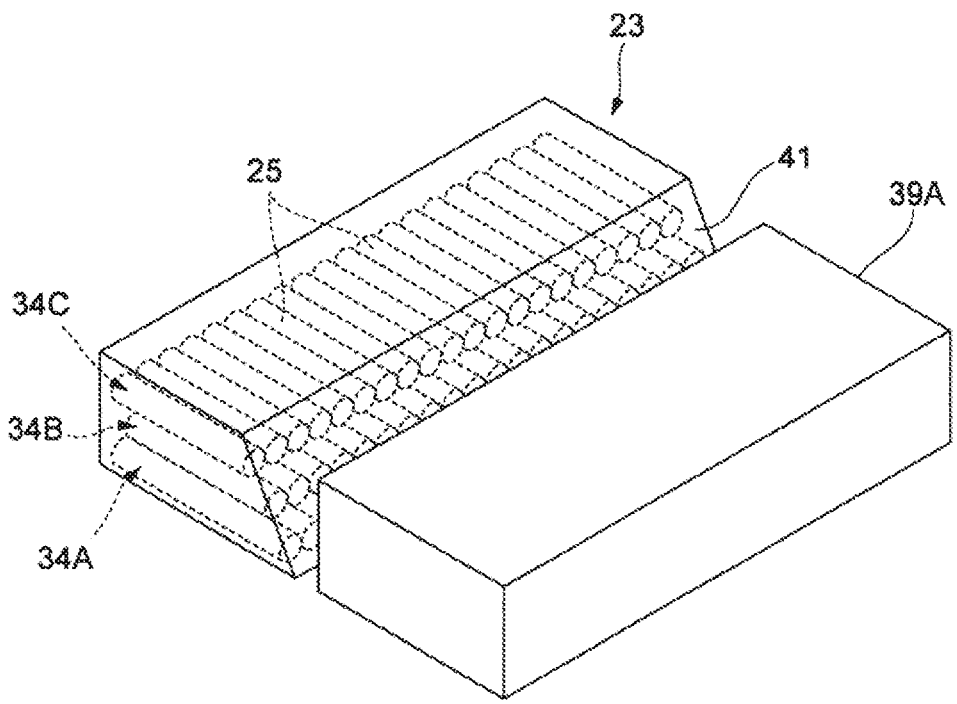
FIG. 6 is a schematic main-part perspective view of another example of the to-be-welded component.

The to-be-welded component 39 may be, as illustrated in FIG. 6, any component fabricated by machining, etc. Also in this case, the additively-manufactured component 23 and the to-be-welded component 39A are welded via a weld joint 41 having a single bevel groove shape to fabricate a structure.

Figure 7:
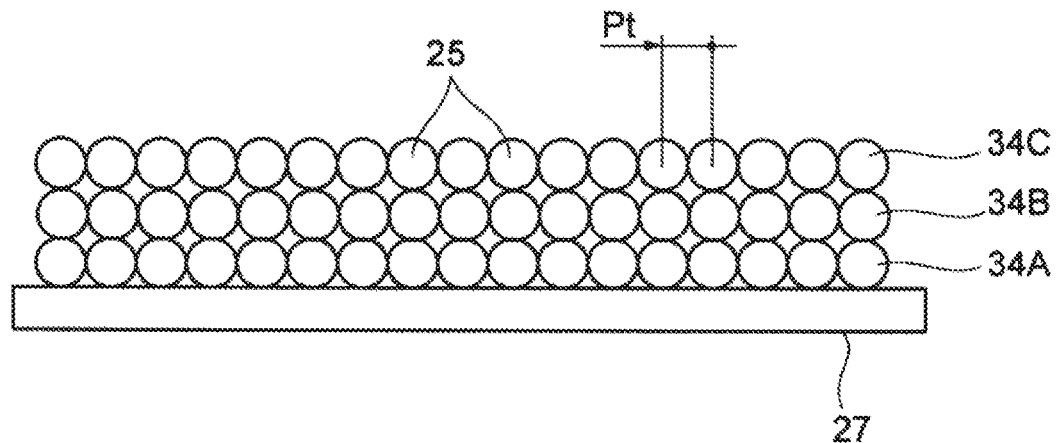
FIG. 7 is a schematic explanatory view illustrating how the weld bead is deposited directly on the weld bead of a previous layer.

In the above example, as illustrated in FIG. 3B, the weld bead 25 is deposited with a shift of half the pitch Pt (Pt/2) of the bead arrangement from the weld bead 25 of a previous layer in the bead arrangement direction along the upper surface of the base 27 of the weld bead 25. In this deposition structure, a gap is less likely to be produced between weld beads, but the deposition is not limited thereto. For example, as schematically illustrated in FIG. 7, the weld bead 25 may be deposited just above the weld bead of a previous layer, that is, may be deposited to have the same phase and the same pitch Pt. In this case, the travel path of a welding torch can be common in respective layers, and the deposition processing can be more simplified. The cross-sectional shape of the weld bead 25 is not a completely circular shape but a flattened shape of being spread toward the adjacent weld bead. Consequently, the gap between weld beads in the illustrated example gets smaller in practice.

OTHER MODIFICATION EXAMPLES

FIGS. 8A to 8D are cross-sectional views schematically illustrating the groove shape of a weld joint formed by building.

Figure 8A:
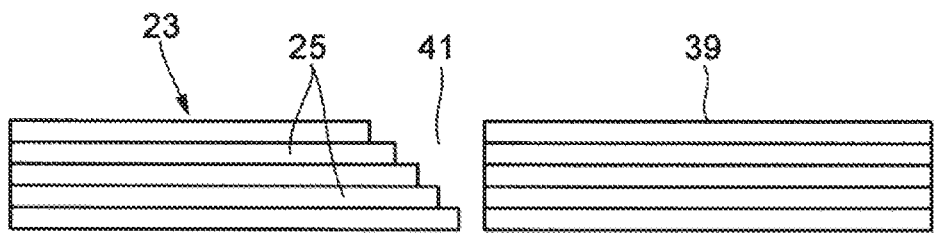
FIG. 8A is a cross-sectional view schematically illustrating the groove shape of the weld joint formed by building.

The weld joint 41 described above is a single bevel groove weld joint illustrated in FIG. 8A.

Figure 8B:
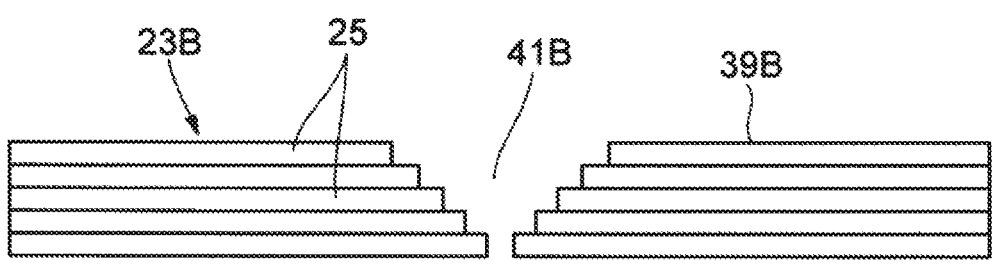
FIG. 8B is a cross-sectional view schematically he groove shape of the weld joint formed by building.
Figure 8C:
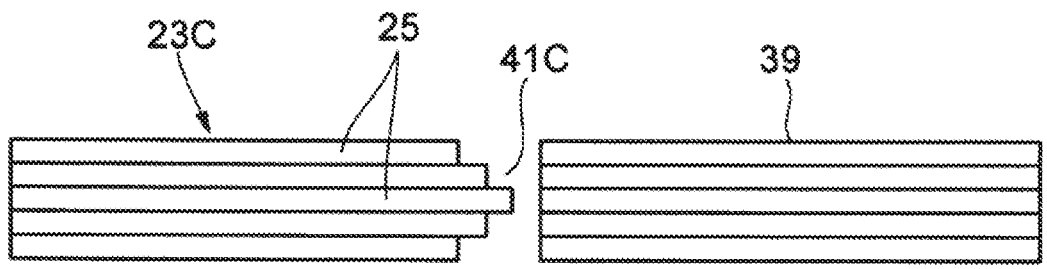
FIG. 8C is a cross-sectional view schematically illustrating the groove shape of the weld joint formed by building.
Figure 8D:
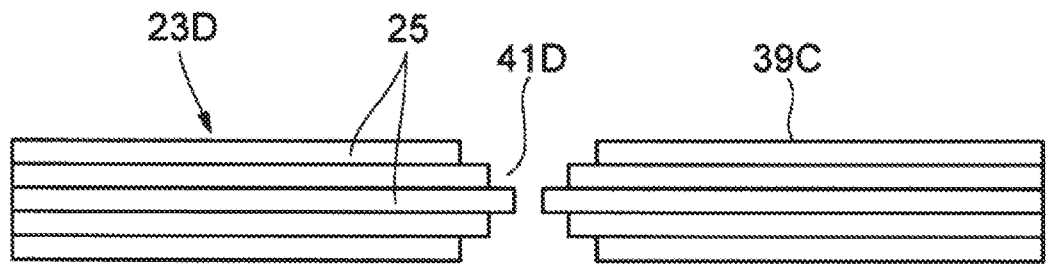
FIG. 8D is a cross-sectional view schematically illustrating the groove shape of the weld joint formed by building.

Other than this, the weld joint 41 may be, as illustrated in FIG. 8B, a single V groove weld joint 41B formed by the additively-manufactured component 23B and the to-be-welded component 39B, may be, as illustrated in FIG. 8C, a double bevel groove weld joint 41C formed by the additively-manufactured component 23C, or may be, as illustrated in FIG. 8D, a double V groove weld joint 41D formed by the additively-manufactured component 23D and the to-be-welded component 39C. Other than the above described groove shapes, the weld joint may have other groove shapes such as single I groove, single J groove, double J groove, single U groove and double U groove.

SECOND CONFIGURATION EXAMPLE

Next, the configuration of a weld joint in which the additively-manufactured component is welded using a backing strip is described.

Figure 9:
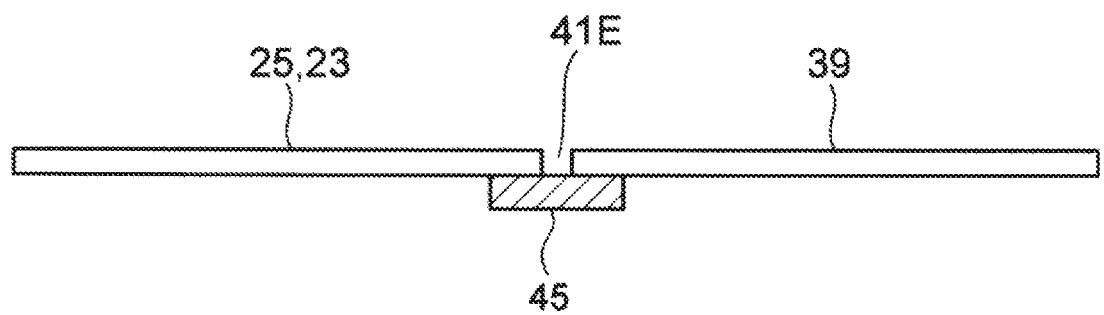
FIG. 9 is a cross-sectional view of the additively-manufactured component and to-be-welded component of a second configuration example.

FIG. 9 is a cross-sectional view of the additively-manufactured component and to-be-welded component of a second configuration example and illustrates a case where the weld joint is welded using a backing strip.

In this configuration example, a backing strip 45 is arranged on the weld joint 41E between the additively-manufactured component 23 formed by depositing a single weld bead 25 in the depth direction of FIG. 9 (direction perpendicular to paper surface) and the tabular to-be-welded component 39 extending similarly in the depth direction. The backing strip 45, the additively-manufactured component 23, and the to-be-welded component 39 are welded, and a one-body structure is thereby obtained. The backing strip 45 may be a plate material additively manufactured by a weld bead, which is prepared separately from the additively-manufactured component 23 and the to-be-welded component 39, but may be a plate material built simultaneously with the additively-manufactured component 23 by the manufacturing apparatus 100 for an additively-manufactured component. Furthermore, the backing strip 45 may be a plate material fabricated by the processing other than additive manufacturing.

In this structure, the additively-manufactured component 23 and the to-be-welded component 39 can be joined by one-side welding. As the backing strip 45, a material adaptable to joining of the additively-manufactured component 23 to the to-be-welded component 39 or the same material as the additively-manufactured component 23 is used.

MODIFICATION EXAMPLE

Figure 10A:
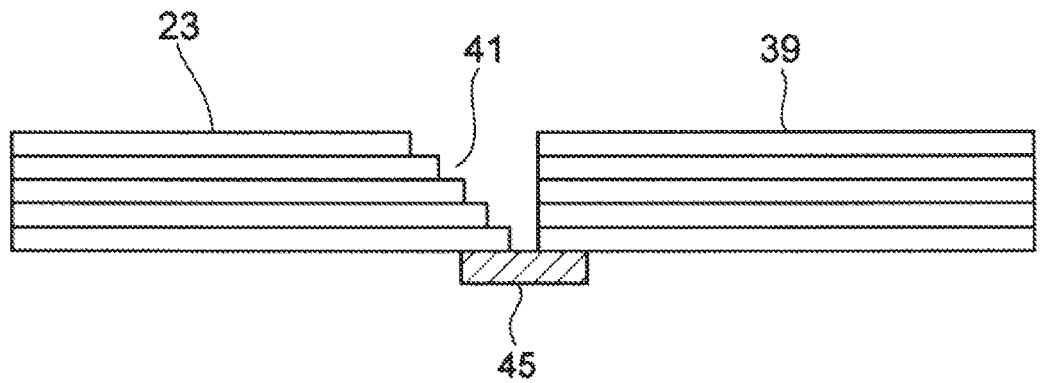
FIG. 10A is a cross-sectional view schematically illustrating the additively-manufactured component and to-be-welded component of a second configuration example.
Figure 10B:
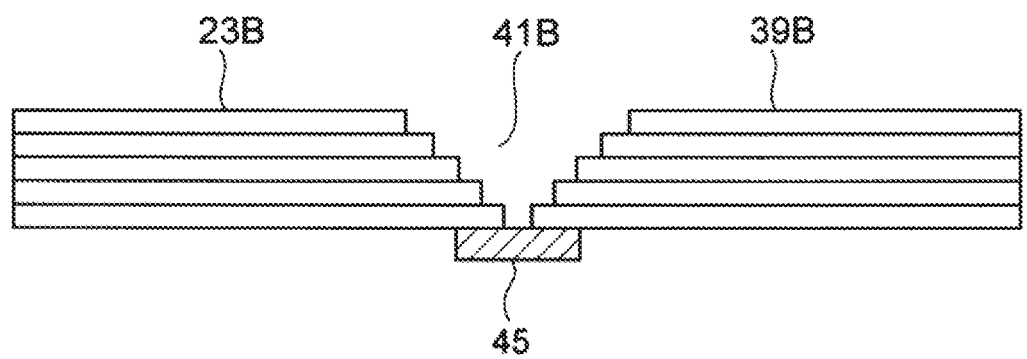
FIG. 10B is a cross-sectional view schematically illustrating the additively-manufactured component and to-be-welded component of a second configuration example.

FIGS. 10A and 10B are cross-sectional views schematically illustrating the additively-manufactured component and to-be-welded component of a modification example of the second configuration example.

FIG. 10A illustrates a configuration in which a backing strip 45 is arranged on the single bevel groove weld joint 41 illustrated in FIG. 8A. FIG. 10B illustrates a configuration in which a backing strip 45 is arranged on the single V groove weld joint 41B illustrated in FIG. 8B.

In both cases, the backing strip 45 may be an additively-manufactured plate material prepared separately or may be a plate material built simultaneously with the additively-manufactured component. In this configuration, the additively-manufactured components are welded to each other together with the backing strip 45, and both components are firmly joined. In addition, the amount of the used shielding gas and the working hours can be reduced, and the welding can be performed with high efficiency.

THIRD CONFIGURATION EXAMPLE

Next, a configuration of a structure in which a backing strip is integrally built with the additively-manufactured component is described below.

Figure 11:
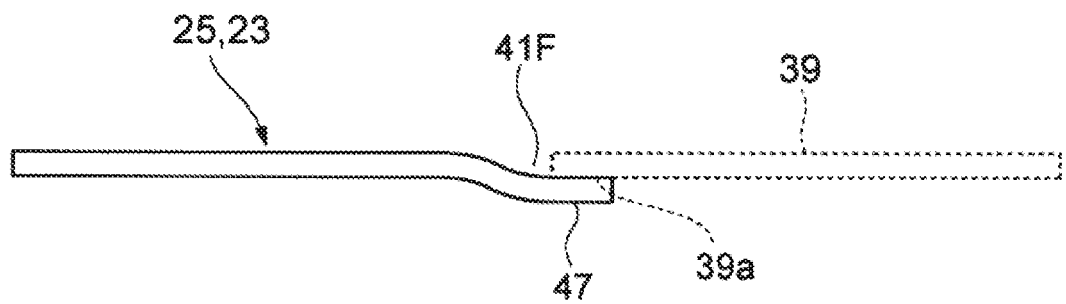
FIG. 11 is a cross-sectional view of the additively-manufactured component and to-be-welded component of a third configuration example.

FIG. 11 is a cross-sectional view of the additively-manufactured component 23 with which a backing strip is integrally built, and the to-be-welded component 39 welded to the additively-manufactured component 23.

In the additively-manufactured component 23 of this configuration example, a bent portion formed by bending a bead extension-direction end of the weld bead 25 substantially in a crank manner by an amount corresponding to the thickness of the to-be-welded component 39 is provided. The weld bead 25 is deposited in the depth direction of FIG. 11 (direction perpendicular to paper surface) to make an additively-manufactured component 23 in which the bent portion is formed as a backing strip 47. The backing strip 47 faces the weld back surface 39a of the tabular to-be-welded component 39 extending in the depth direction and constitutes the weld joint 41F.

In this configuration, the backing strip 47 is integrally built with the additively-manufactured component 23 and therefore, a member serving as the backing strip need not be prepared separately, so that the welding step of the weld joint 41F can be simplified.

FOURTH CONFIGURATION EXAMPLE

Next, a configuration of a structure using an additively-manufactured component in which a backing strip is integrally built with the weld joint is described below.

Figure 12A:
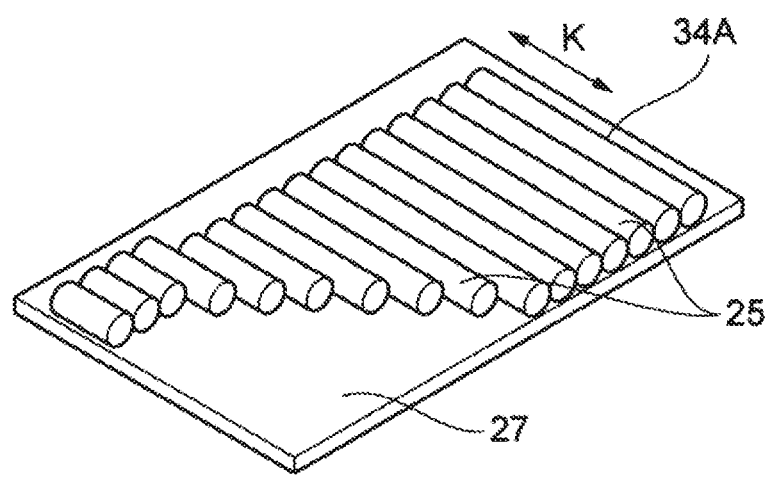
FIG. 12A is an explanatory view illustrating the building operation procedure of the additively-manufactured component of a fourth configuration example.
Figure 12B:
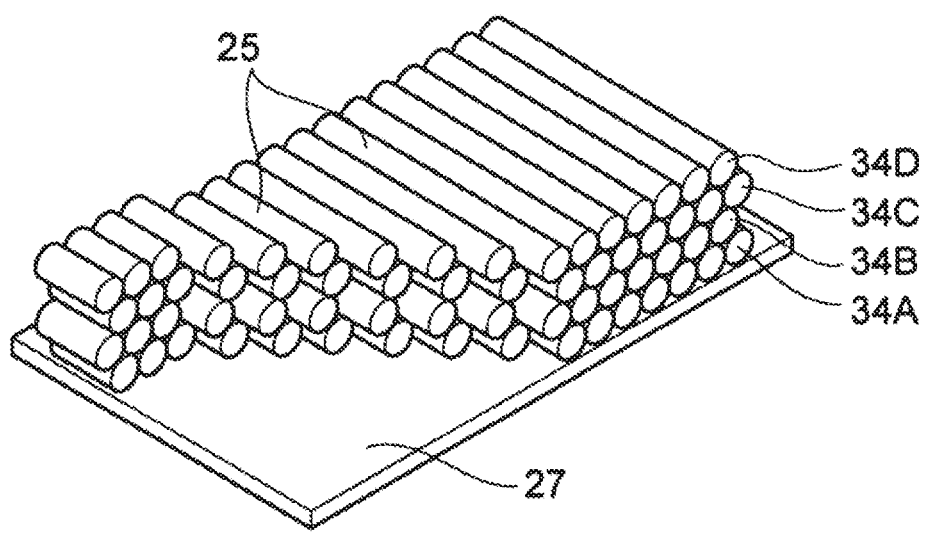
FIG. 12B is an explanatory view illustrating the building operation procedure of the additively-manufactured component of a fourth configuration example.
Figure 12C:
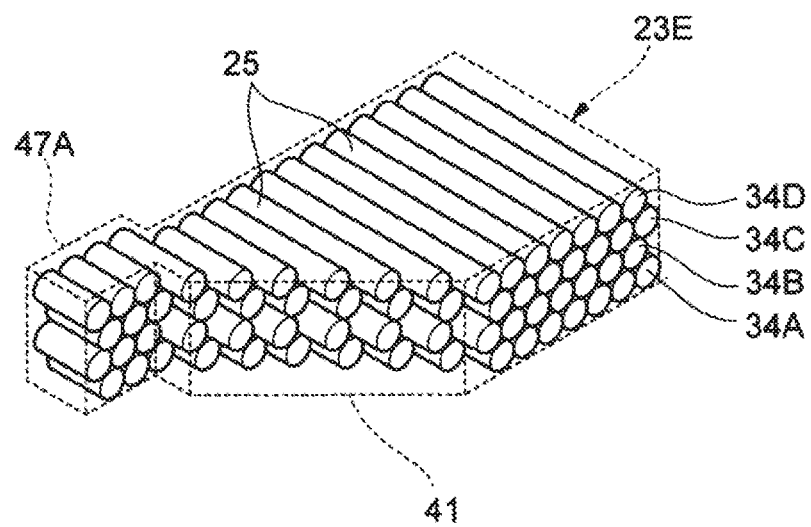
FIG. 12C is an explanatory view illustrating the building operation procedure of the additively-manufactured component of a fourth configuration example.

FIGS. 12A to 12C are explanatory views illustrating the building operation procedure of the additively-manufactured component in which a groove and a backing strip are integrally built by a plurality of weld beads 25 differing in the length.

In the additively-manufactured component of this configuration, first, as illustrated in FIG. 12A, a weld bead 25 is formed in a plurality of rows on the base 27 and at the same time, as for the groove and backing strip regions, is formed by changing the length in the extension direction K of the weld bead 25 or the forming position. More specifically, the weld bead at one end in the arrangement direction (direction orthogonal to the extension direction K) of the weld bead 25 is formed with a shift to one side of the bead extension direction within the weld bead layer. A first weld bead layer 34A is thereby built.

Next, as illustrated in FIG. 12B, a weld bead 25 having the same length (shape) as the first weld bead layer 34A is deposited on the first weld bead layer 34A to form a second weld bead layer 34B having the same shape as the first layer. Subsequently, a third weld bead layer 34C and a fourth weld bead layer 34D are deposited in the same manner on the weld bead layer of a previous layer, thereby building up an additively-manufactured component 23E in which, as illustrated in FIG. 12C, the weld joint 41 having a groove and the backing strip 47A are integrally formed. FIG. 12C illustrates an additively-manufactured component 23E having a single bevel groove weld joint 41 after removing the base 27 depicted in FIG. 12B.

Figure 13A:
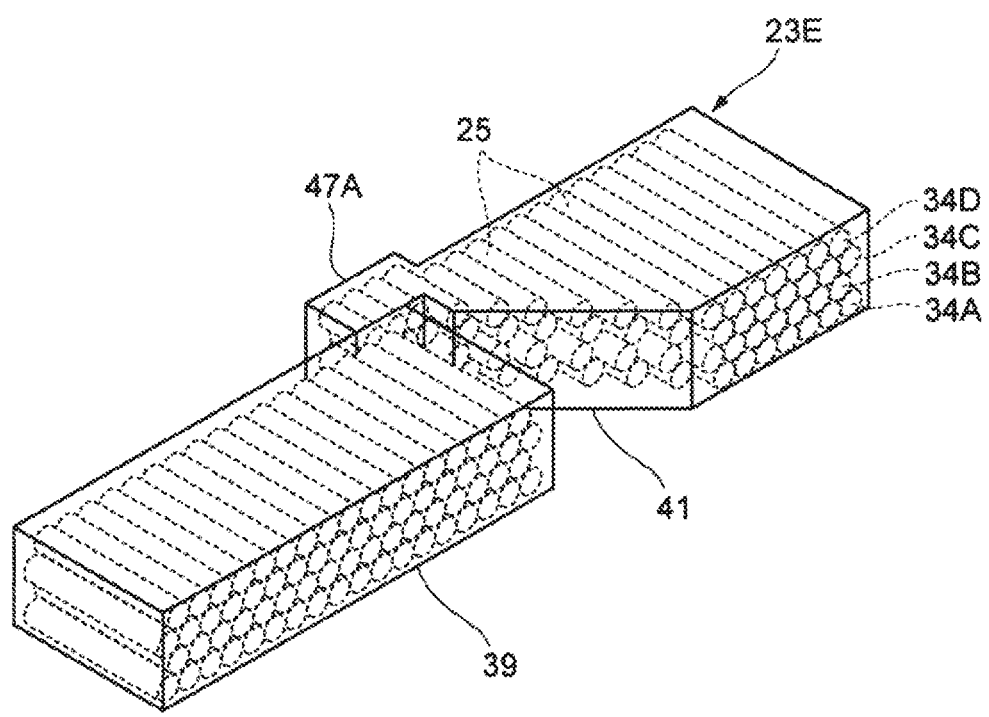
FIG. 13A is a schematic perspective view illustrating the welding procedure of the additively-manufactured component depicted in FIG. 12C to a to-be-welded component.
Figure 13B:
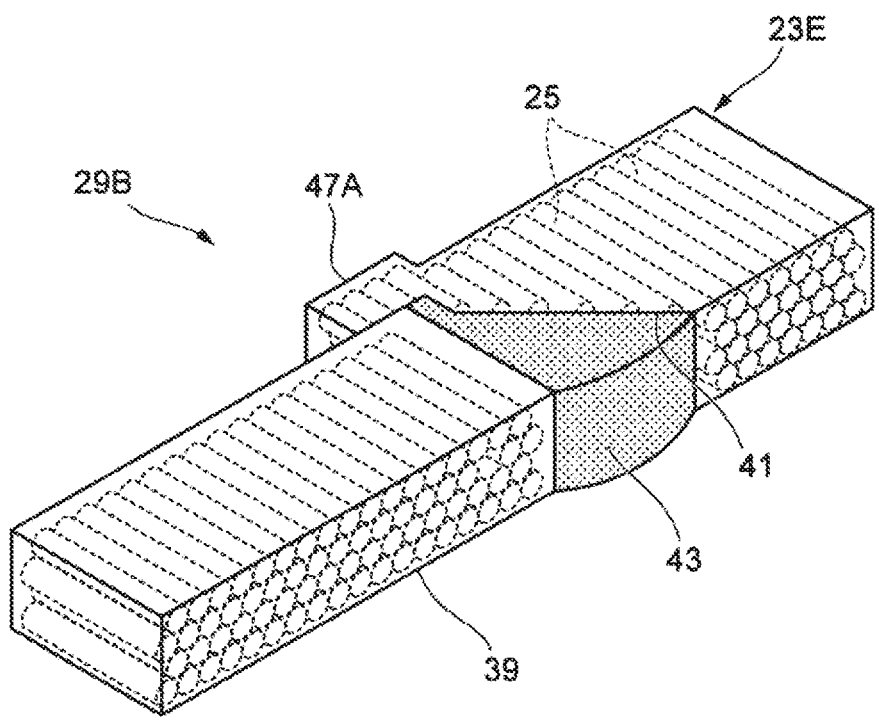
FIG. 13B is a schematic perspective view illustrating the welding procedure of the additively-manufactured component depicted in FIG. 12C to a to-be-welded component.

FIGS. 13A and 13B are schematic perspective views illustrating the welding procedure of the additively-manufactured component 23E depicted in FIG. 12C and a to-be-welded component 39.

As illustrated in FIG. 13A, a previously prepared to-be-welded component 39 is arranged to butt against the backing strip 47A of the additively-manufactured component 23E. In the illustrated example, the contour is denoted by a solid line so as to facilitate understanding of the shape of the weld joint 41 or backing strip 47A.

As illustrated in FIG. 13B, a structure 29B in which the additively-manufactured component 23E and the to-be-welded component 39 are integrated by a welded portion 43 formed by welding the additively-manufactured component 23E and the to-be-welded component 39 via the weld joint 41 is fabricated. In the to-be-welded component 39 of the illustrated example, similarly to the additive-manufactured component 23E of this configuration example, a plurality of weld bead layers are formed in the thickness direction of the additively-manufactured component 23E. The to-be-welded component 39 may be any component separately fabricated by machining, etc.

MODIFICATION EXAMPLE

Figure 14A:
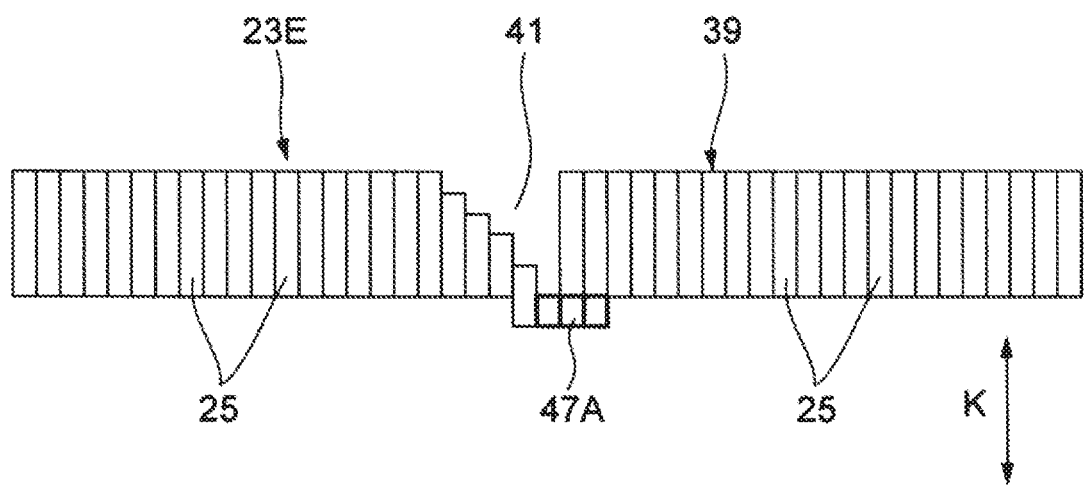
FIG. 14A is a cross-sectional view illustrating the weld joint between the additively-manufactured component depicted in FIG. 13A and a to-be-welded component.

FIG. 14A is an explanatory view illustrating a weld joint between the additively-manufactured component 23E depicted in FIG. 13A and a to-be-welded component 39. This figure illustrates the state before welding of the additively-manufactured component 23E in which a single bevel groove weld joint 41 and a backing strip 47A are integrally built, and the to-be-welded component 39 fabricated by depositing a plurality of weld bead layers.

Figure 14B:
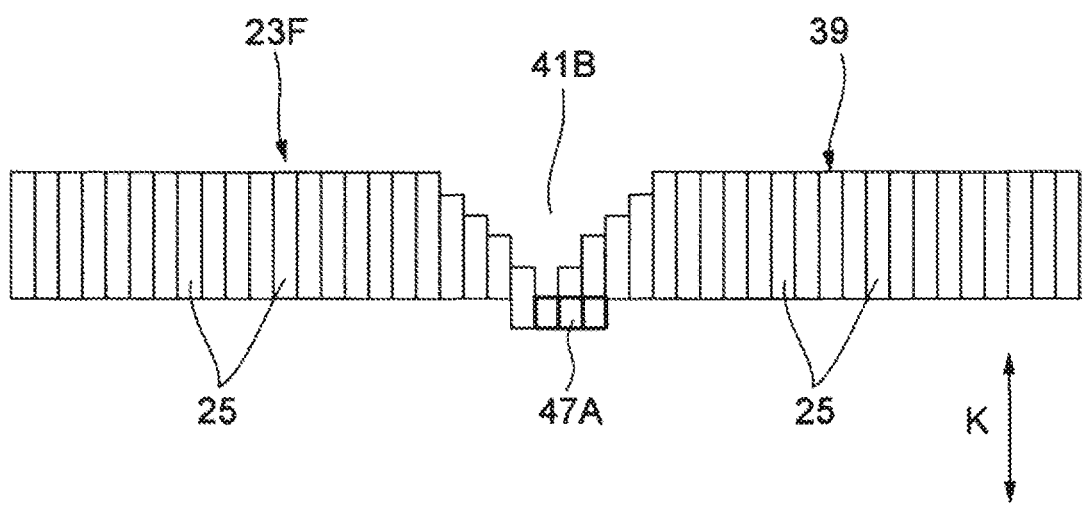
FIG. 14B is a cross-sectional view illustrating the additively-manufactured component and the to-be-welded component in the case where the weld joint of FIG. 14A is a single V-groove joint.

FIG. 14B illustrates the state before welding of the additively-manufactured component 23F in which a single V-groove weld joint 41B fabricated by the same procedure and a backing strip 47A are integrally built, and the to-be-welded component 39. The groove shape of the weld joint may be, similarly to the above, any shape such as double bevel groove, double V groove, square groove, single J groove, double J groove, single U groove and double U groove, other than a single bevel groove and a single V groove.

Figure 15:
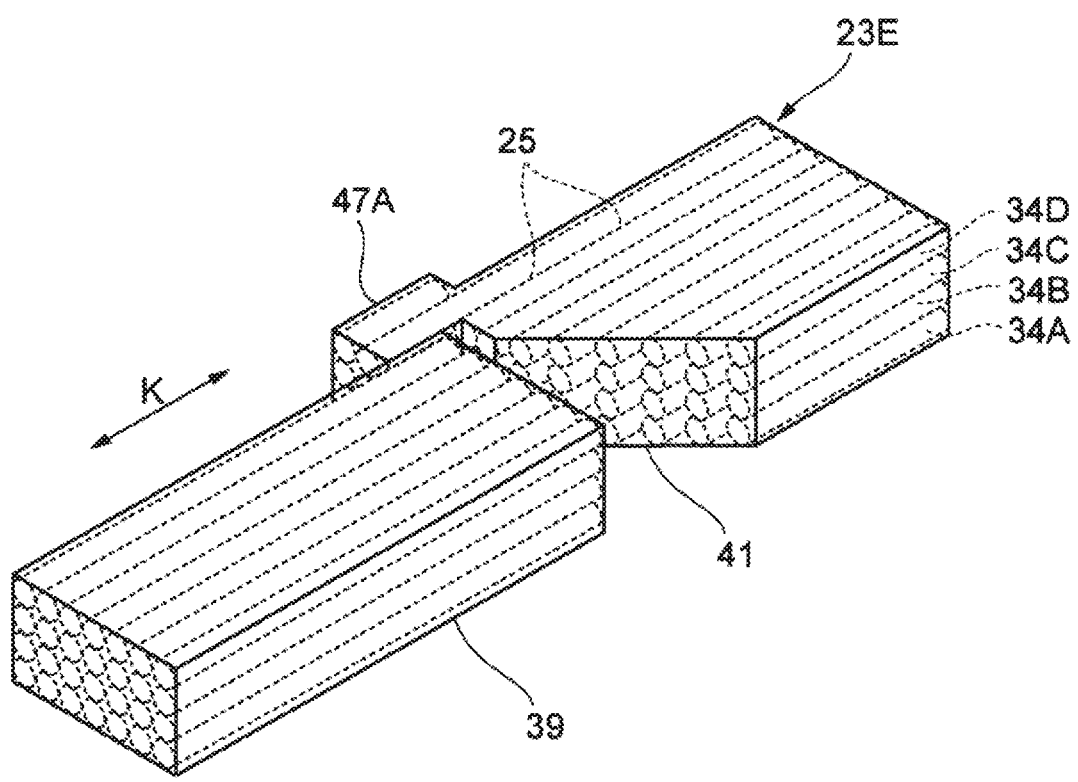
FIG. 15 is a schematic perspective view illustrating the welding procedure of the additively-manufactured component and the to-be-welded component in the case where the weld bead extension direction depicted in FIG. 13A is changed to a direction orthogonal to the depth direction of an opening of the weld joint.

In the above-described additively-manufactured component 23E (the same for 23F) and to-be-welded component 39, the weld bead 25 extension direction K is parallel to the depth direction of the opening of the weld joint 41, but the configuration is not limited thereto. For example, as illustrated in FIG. 15, the weld bead 25 extension direction K may be a direction orthogonal to the depth direction of the opening of the weld joint 41. In addition, the deposition position of the weld bead 25 may be just above the weld bead of a previous layer as in the illustrated example, or the weld bead may be deposited with a shift by half the pitch Pt of the bead arrangement.

FIFTH CONFIGURATION EXAMPLE

Figure 16A:
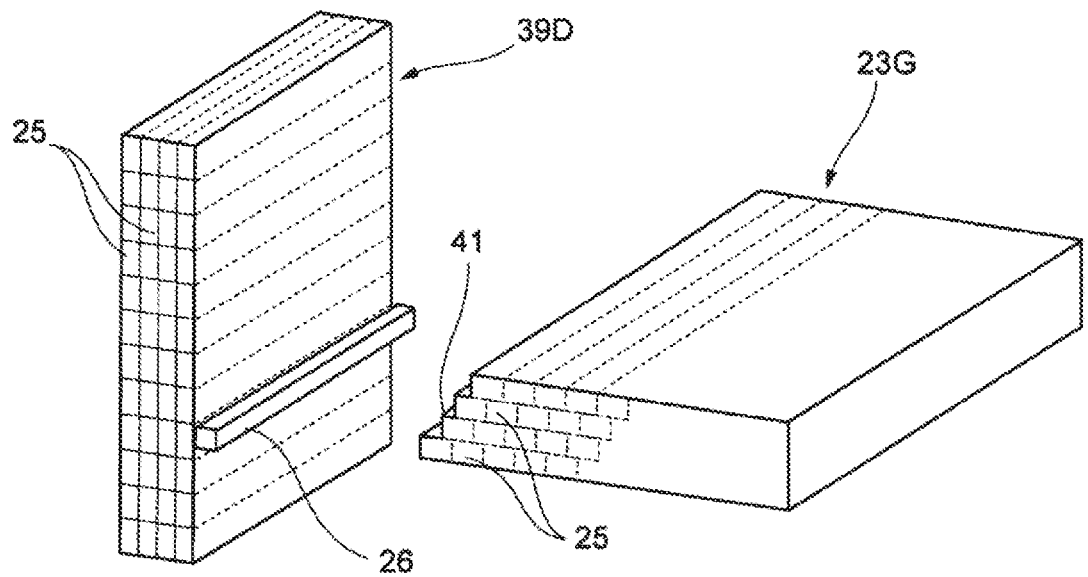
FIG. 16A is a schematic perspective view illustrating the additively-manufactured component and the to-be-welded component.
Figure 16B:
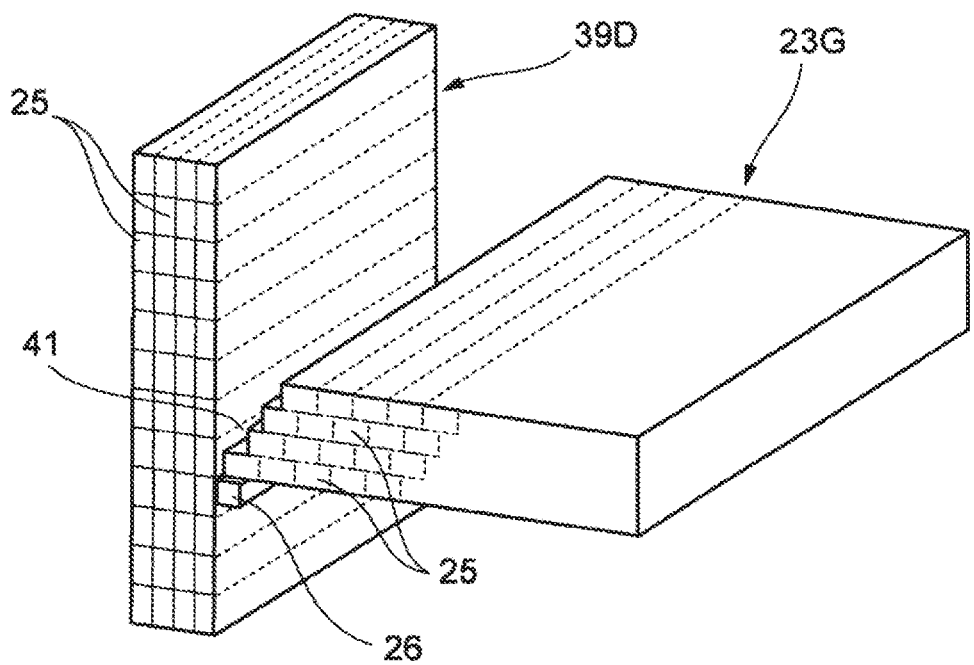
FIG. 16B is a schematic perspective view illustrating the state where a weld joint is formed by the additively-manufactured component and the to-be-welded component.

A case where the structure of the fifth configuration example is applied to a T-joint is described below FIG. 16A is a schematic perspective view illustrating an additively-manufactured component 23G and a to-be-welded component 39D, and FIG. 16B is a schematic perspective view illustrating the state where a weld joint is formed by an additively-manufactured component 23G and a to-be-welded component 39D.

As illustrated in FIG. 16A, the additively-manufactured component 23G is a plate-like member in which weld bead layers constituted by a plurality of weld beads 25 are deposited, and a weld joint 41 having a single bevel groove inclined in the plate thickness direction is formed at one end.

The to-be-welded component 39D is a plate-like member in which weld bead layers by a plurality of weld beads 25 are deposited. On the plate surface on the joining side of the to-be-welded component 39D to the additively-manufactured component 23G, a penetration bead 26 is formed by additive manufacturing. The penetration bead 26 is formed along the groove of the additively-manufactured component 23G to be joined. The to-be-welded component 39D may be a component fabricated by other processing methods, and the penetration bead 26 may have a configuration where a separately prepared plate or bar material is attached to the to-be-welded component 39D. The penetration bead 26 may be composed of a plurality of weld beads 25.

In the additively-manufactured component 23G and the to-be-welded component 39B, as illustrated in FIG. 16B, the weld joint 41 of the additively-manufactured component 23G is made to abut against the plate surface of the to-be-welded component 39D in the perpendicular direction such that the penetration bead 26 is arranged with a predetermined spacing on the back surface side of the weld joint 41. More specifically, a T-joint is composed of the additively-manufactured component 23G and the to-be-welded component 39D, and both components are joined by welding the T-joint.

Figure 17:
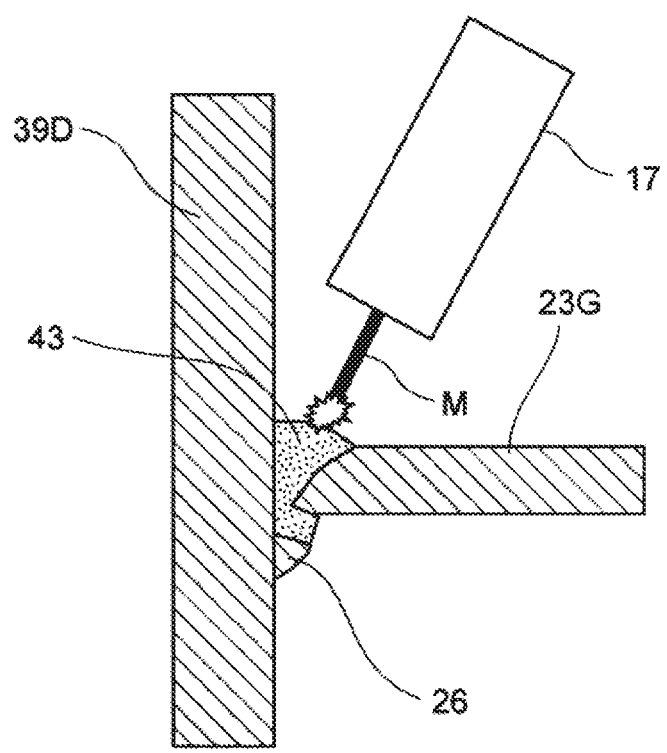
FIG. 17 is an explanatory view illustrating how the additively-manufactured component and the to-be-welded component are welded.

FIG. 17 is an explanatory view illustrating how the additively-manufactured component 23G and the to-be-welded component 39D are welded, As illustrated in the figure, the to-be-welded component 38D is arranged with its plate surface in vertical direction, and the additively-manufactured component 23G is arranged with its plate surface in horizontal direction. The components are then welded to each other while the torch 17 of the welding robot 19 illustrated in FIG. 1 is moved along the groove of the weld joint 41 from above the additively-manufactured component 23G.

At this time, the molten metal resulting from the melting of the filler metal M and the base metal of the joint is held back by the penetration bead 26 and prevented from dripping from the groove. Consequently, the molten metal stays within a region surrounded by the groove of the additively-manufactured component 23G, the to-be-welded component 39D, and the penetration bead 26 and is solidified to form a welded portion 43.

In this configuration, in the one-side fillet welding, a molten metal melted out to the back side of the welded portion is caught by the penetration bead 26, and a full penetration weld joint can thereby be formed. In this case, the bead on the back side is finely formed without generating an unwelded portion and therefore, development of a crack in the welded portion is prevented, so that the weld strength can be enhanced. On the other hand, in the case where welding is performed with a backing strip separately provided in place of the penetration bead 26, an unwelded portion is sometimes generated between the backing strip and the to-be-welded component 39D or between the backing strip and the additively-manufactured component 23G. In this case, the weld strength is sometimes insufficient due to development of separation or crack of the unwelded portion upon application of a load.

Figure 4A:
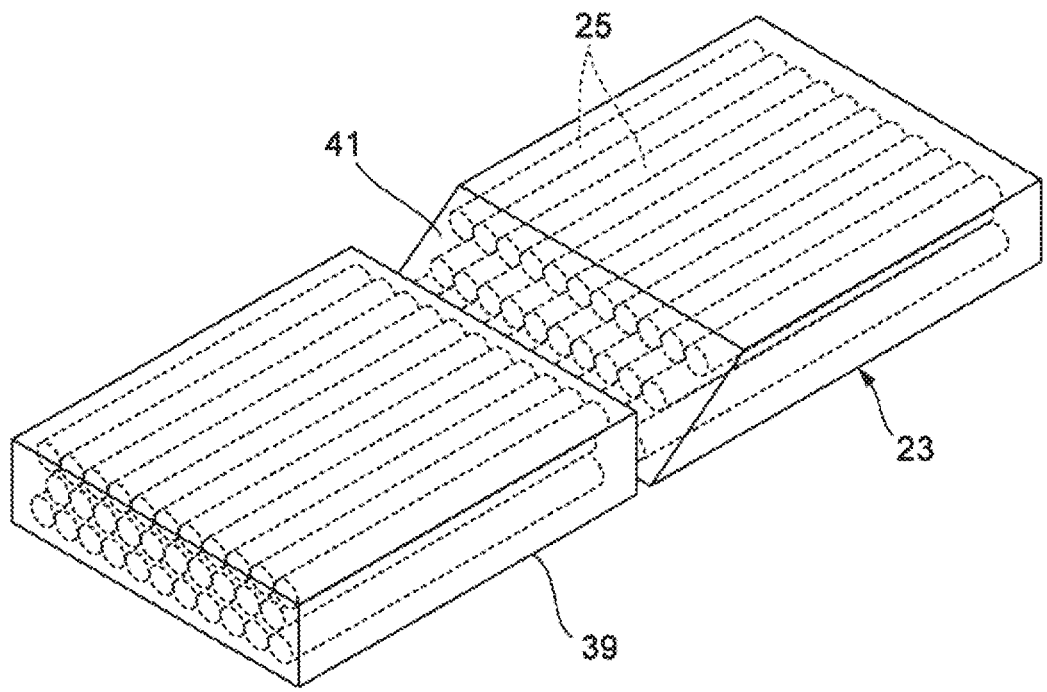
FIG. 4A is a process explanatory view illustrating the procedure of joining the additively-manufactured component and to-be-welded component of a first configuration example.
Figure 4B:
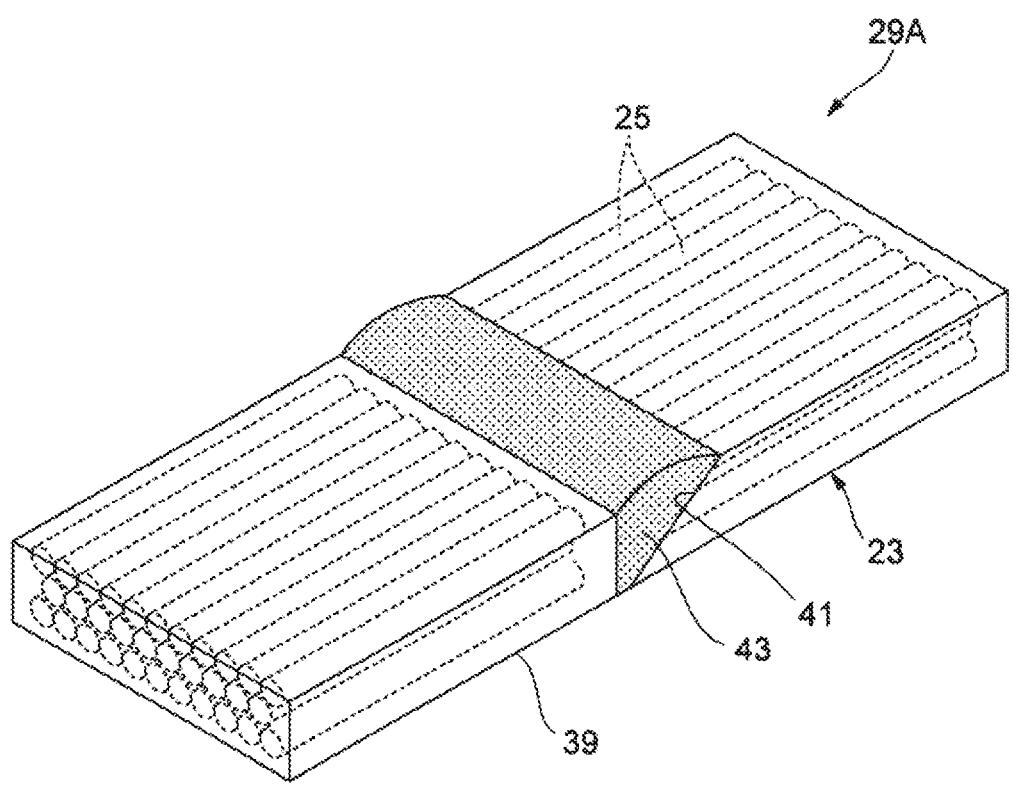
FIG. 4B is a process explanatory view illustrating the procedure of joining the additively-manufactured component and to-be-welded component of a first configuration example.

The weld joint 41 of this configuration is the same groove as the weld joint 41A illustrated in FIG. 5 but may have a configuration in which the direction of the weld bead is changed as in the weld joint 41 illustrated in FIG. 4A.

SIXTH CONFIGURATION EXAMPLE

A structure in which a cylindrical additively-manufactured component and a cylindrical to-be-welded component are integrated by welding is described below.

Figure 18:
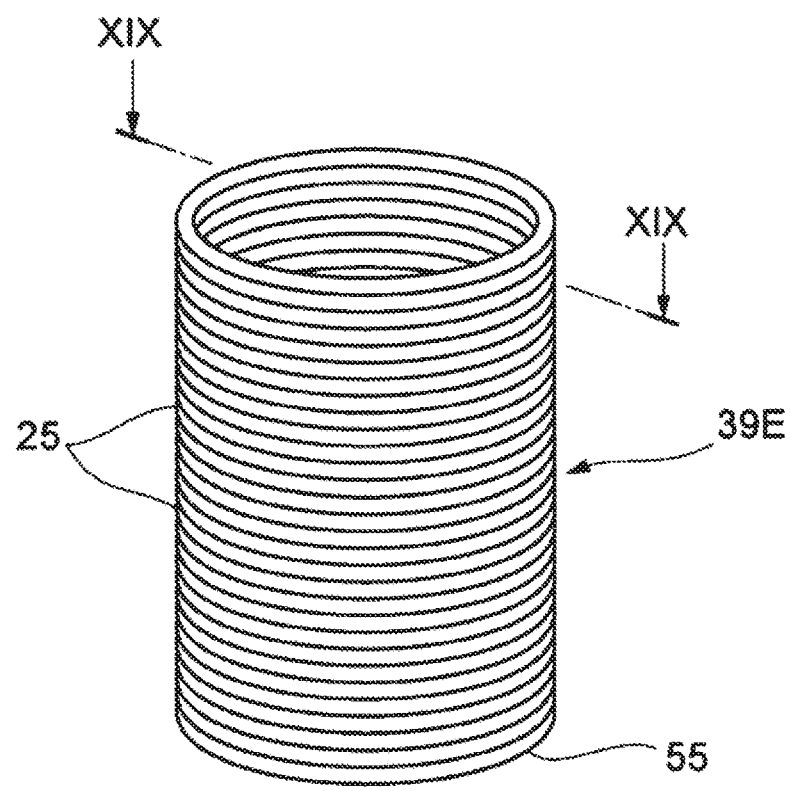
FIG. 18 is a perspective view illustrating a cylindrical additively-manufactured component and a cylindrical to-be-welded component of a fifth configuration example.

FIG. 18 is a perspective view illustrating a cylindrical additively-manufactured component 23H and a cylindrical to-be-welded component 39E.

The additively-manufactured component 23H of this configuration has a cylindrical main body part 49 and an inner cylindrical part 51 that is provided in contact with the inner circumferential surface at one end in the axial direction of the main body part 49 and protrudes outward in the axial direction. Each of the main body part 49 and the inner cylindrical part 51 is built by a weld bead layer in which the weld bead 25 is helically or annularly deposited. More specifically, in the additively-manufactured component 23H, the main body part 49 and the inner cylindrical part 51 are integrally built, and the portion of the inner cylindrical part 51 protruding from the main body part 49 serves as the weld joint weldable to another component different from the additively-manufactured component 23H.

The to-be-welded component 39E is an additively-manufactured component built in a cylindrical shape by a weld bead layer in which the weld bead 25 is helically or annularly deposited. The to-be-welded component 39E is built to have a slightly larger inner diameter than the outer diameter of the inner cylindrical part 51 of the additively-manufactured component 23H.

Figure 19A:
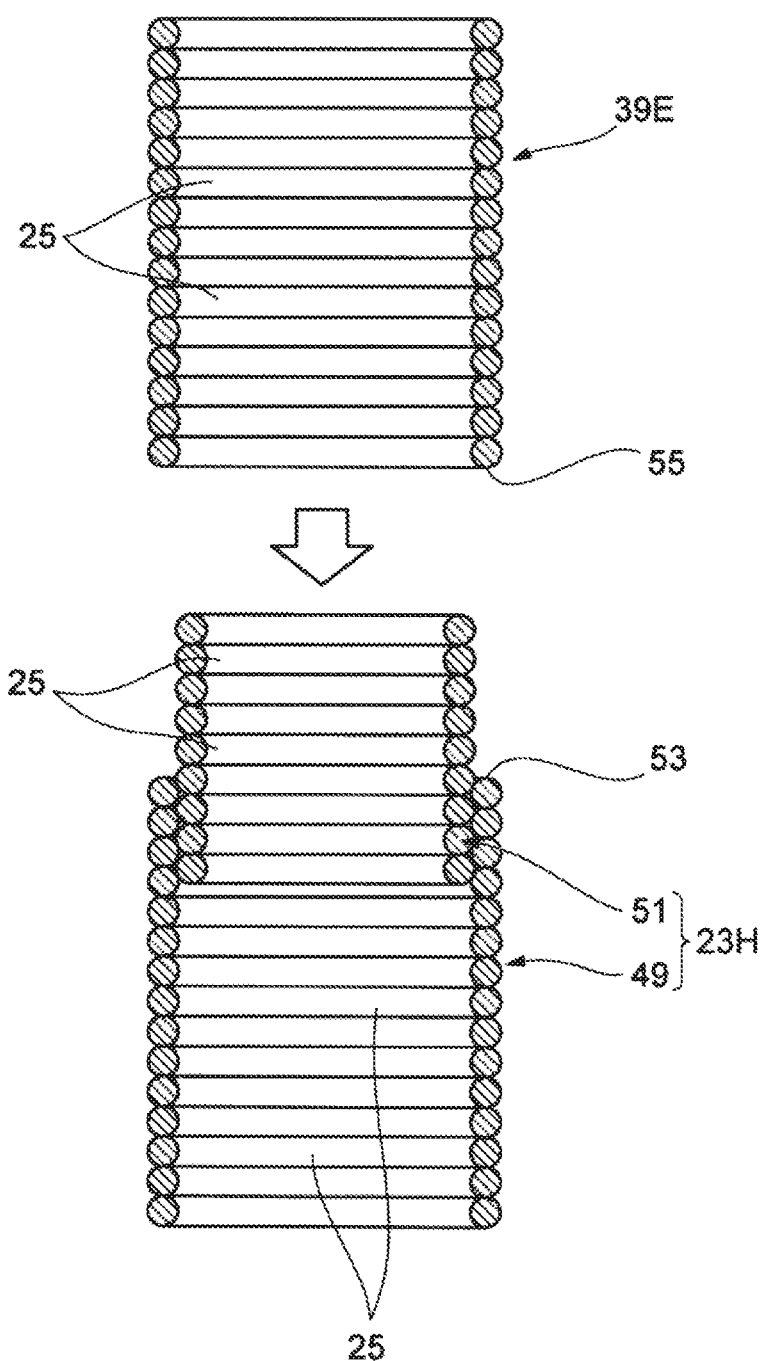
FIG. 19A is a cross-sectional view illustrating the XIX-XIX line cross-section of FIG. 18.
Figure 19B:
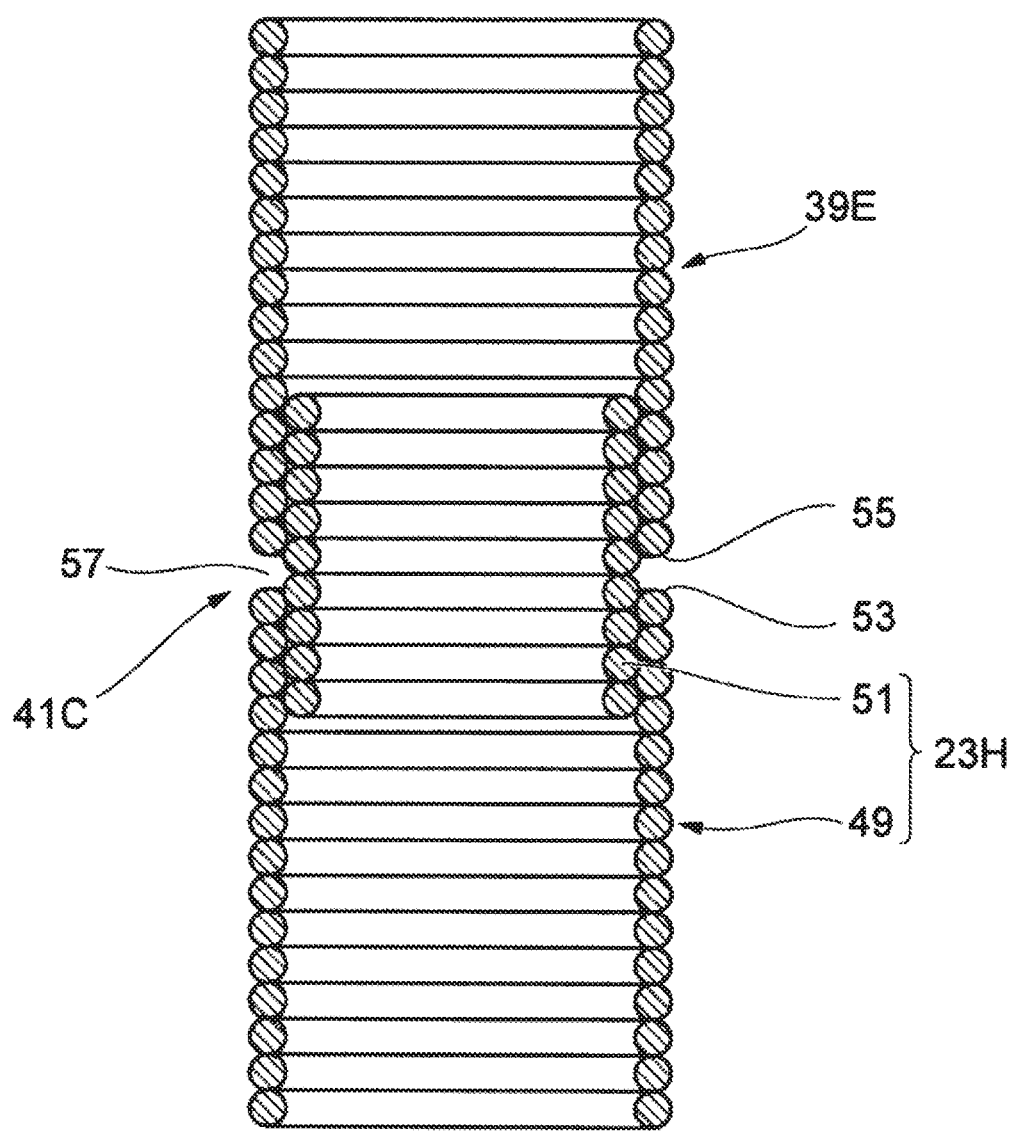
FIG. 19B is a cross-sectional view illustrating the state where the additively-manufactured component depicted in FIG. 19A and the to-be-welded component are fitted.

FIG. 19A is a cross-sectional view illustrating the XIX-XIX line cross-section of FIG. 18, and FIG. 19B is a cross-sectional view illustrating the state where the additively-manufactured component 23H and a to-be-welded component 39E are fitted.

As illustrated in FIGS. 19A and 19B, the to-be-welded component 39E is inserted along the cylinder axis into the inner cylindrical part 51 of the additively-manufactured component 23H. Consequently, the components are coaxially fitted in the state that the inner circumference of the to-be-welded component 39E abuts on the outer circumference of the inner cylindrical part 51 of the additively-manufactured component 23H. At this time, an annular axial-direction gap 57 is left between the step portion 53 in the radial direction formed between the main body part 49 and inner cylindrical part 51 of the additively-manufactured component 23H, and the end portion 55 on the insertion tip side of the to-be-welded component 39E. This gap 57 allows the step portion 53 at one end of the main body 49 of the additively-manufactured component 23H and the end portion 55 of the to-be-welded component 39E to function as the weld joint 41C and the inner cylindrical part 51 to function as the backing strip.

Figure 20:
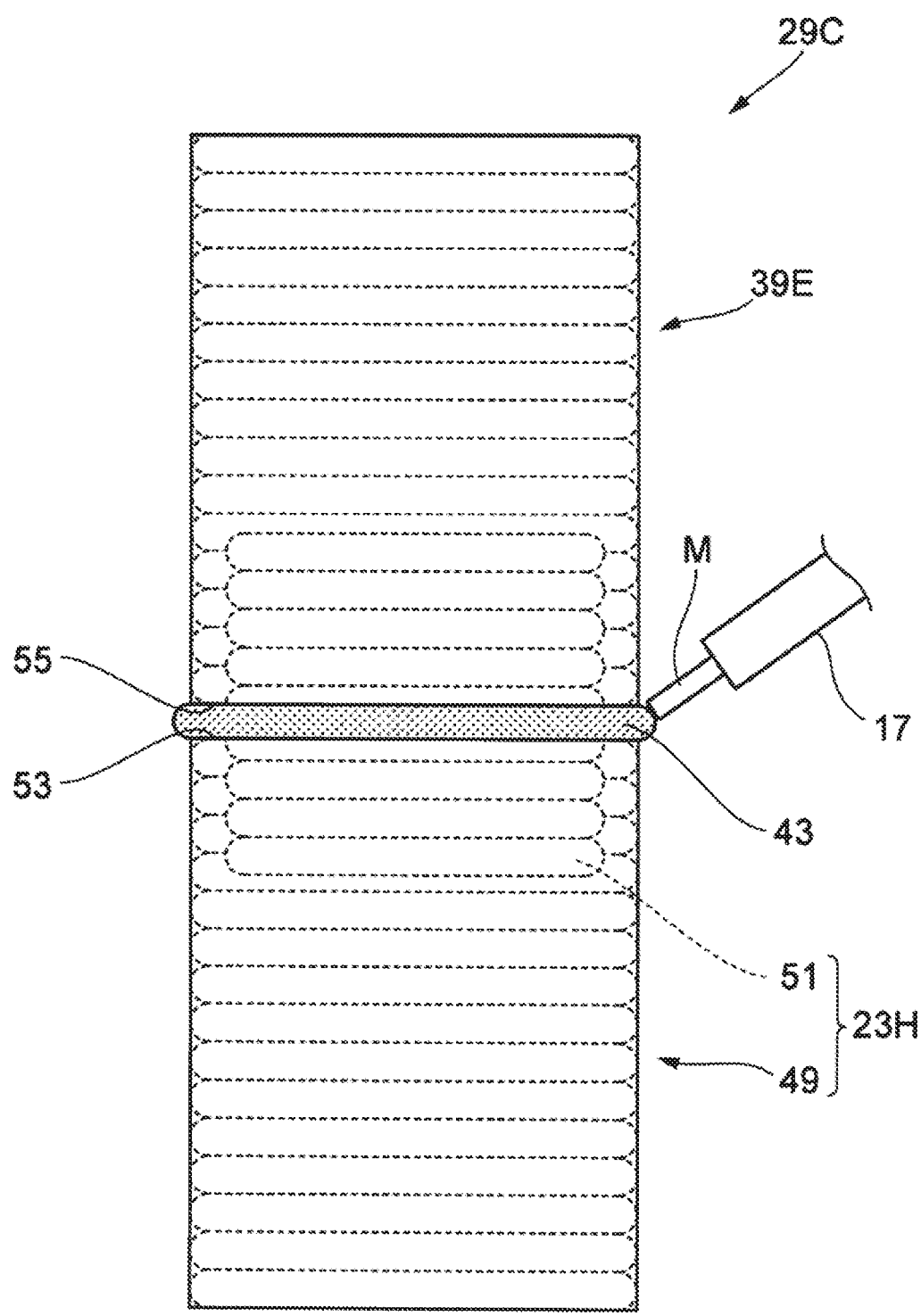
FIG. 20 is an explanatory view illustrating how the structure is fabricated by welding the additively-manufactured component and the to-be-welded component.

FIG. 20 is an explanatory view illustrating how a structure is fabricated by welding the additively-manufactured component 23H and the to-be-welded component 39E.

In the state of the additive-manufactured component 23H and the to-be-welded component 39E being fitted, the additive-manufactured component 23H and the to-be-welded component 39E are welded while the torch 17 (see also FIG. 1) is moved along the circumferential direction of the gap 57. As a result, a welded portion 43 is formed in the gap 57, and a structure 29C in which the additive-manufactured component 23H and the to-be-welded component 39E are integrated is obtained.

In the structure 29C of this configuration, small additively-manufactured components (additively-manufactured component 23H, to-be-welded component 39E) are welded to each other, and a structure of a size exceeding the range of movement of, for example, the welding robot 19 illustrated in FIG. 1 can thereby be easily fabricated. In addition, the structure 29C having a double structure and the structure 29A can be fabricated easily with a high quality.

The above example employs a configuration where the weld bead layer of a next layer is deposited on the annular inner circumferential side within the weld bead layer of a previous layer, but a configuration where the layer is deposited on the annular outer circumferential side may also be employed. In this case, the additive-manufactured component 23H and the to-be-welded component 39E are fitted by leaving an axial-direction gap, and the gap is welded from the inner circumferential side.

In addition, although the above example shows a thin-wall structure, in the case of fabricating a structure having a larger wall thickness, this may be attained by depositing a plurality of weld bead layers with respect to the radial direction, and forming and joining the above-described weld joint such as double bevel groove and double V groove.

In this way, the present invention is not limited to the embodiments above, and mutual combination of respective configurations of the embodiments as well as modifications and applications by one skilled in the art based on the disclosure in the description and known techniques are also intended by the present invention and encompassed by the scope of protection sought.

For example, the configuration examples above are described by taking a butt joint and a T-joint as an example, but other than these, the joining method can be applied also to various weld joints (JIS Z 3001) such as cruciform joint, corner joint, spliced joint, lap joint and edge joint.

This application is based on Japanese Patent Application No. 2017-88781 filed on Apr. 27, 2017 and Japanese Patent Application No. 2017-177813 filed on Sep. 15, 2017, the contents of which are incorporated herein by way of reference.

REFERENCE SIGNS LIST 23, 23A, 23B, 23C, 23D, 23E, 23F, 23G, 23H, 23Ua, 23Da Additively-manufactured component
25 Weld bead
29, 29A, 29B, 29C Structure
36a, 36b, 36c Layer end edge
39, 39A, 39B, 39C, 39D, 39E To-be-welded component
41, 41A, 41B 41C Weld joint
Welded portion
47, 47A Backing strip
M Filler metal

The invention claimed is:

1. A method for joining an additively-manufactured component, comprising welding a plurality of additively-manufactured components via a weld joint to fabricate an integral structure, wherein:
the additively-manufactured components are built by repeatedly depositing a weld bead layer of a next layer formed of a plurality of second weld beads on a previous weld bead layer formed of a plurality of first weld beads obtained by melting and solidifying a filler metal by use of an arc; and
the weld joint is built along with the deposition by decreasing a length of each weld bead of the plurality of second weld beads on at least one of the plurality of additively-manufactured components such that an angled groove is formed between two of the plurality of additively-manufactured components and the two of the plurality of additively-manufactured components are welded together by a welded portion added to the groove.

2. The method for joining an additively-manufactured component according to claim 1, wherein:
each of the weld bead layers is formed of an annular weld bead; and
the weld bead layer of the next layer is deposited on at least one of an annular inner circumferential side and an outer circumferential side in the previous weld bead layer to build the weld joint in the additively-manufactured components.

3. The method for joining an additively-manufactured component according to claim 1, wherein:
the previous weld bead layer is formed of the plurality of first weld beads arranged in a plurality of rows; and
the weld bead layer of the next layer is deposited with a shift in one direction within the layer plane from the layer end edge of the previous weld bead layer to build a groove shape of the weld joint.

4. The method for joining an additively-manufactured component according to claim 3,
wherein a backing strip is arranged in the weld joint and the additively-manufactured components are welded to each other together with the backing strip.

5. The method for joining an additively-manufactured component according to claim 1,
wherein a backing strip is arranged in the weld joint and the additively-manufactured components are welded to each other together with the backing strip.

6. The method for joining an additively-manufactured component according to claim 5, wherein:
a bent portion formed by bending a bead extension-direction end is formed in the weld bead; and
the weld bead layer of the next layer is repeatedly deposited on the previous weld bead layer to build the backing strip by the bent portion.

7. The method for joining an additively-manufactured component according to claim 5, wherein:
each of the weld bead layer of the next layer and the previous weld bead layer is formed of the plurality of first weld beads and the plurality of second weld beads arranged in a plurality of respective rows; and
one end of at least one of the weld bead layer of the next layer and the previous weld bead layer in an arrangement direction of the respective weld bead layer is shifted to one side of a bead extension direction within the respective weld bead layer to build the backing strip.

8. A method for joining an additively-manufactured component, comprising welding a plurality of additively-manufactured components via a weld joint to fabricate an integral structure, wherein:
the additively-manufactured components are built by repeatedly depositing a weld bead layer of a next layer on a previous weld bead layer formed of a weld bead obtained by melting and solidifying a filler metal by use of an arc, the weld bead layer being formed of a plurality of rows of annular weld beads;
the weld joint is built along with the deposition; and
the method further comprises depositing the weld bead layer of the next layer with a shift in at least one of an annular inner circumferential side or an annular outer circumferential side within a layer plane from a layer end edge of the bead layer of the previous layer and forming the weld joint to have a single bevel groove, a single V groove, a double V groove, a single J groove, a double J groove, a single U groove, or a double U groove, and welding two of the plurality of additively-manufactured components together by a welded portion added to the groove.

* * * * *